(12) United States Patent
Paredes Cabrera

(10) Patent No.: US 10,785,789 B2
(45) Date of Patent: Sep. 22, 2020

(54) SYSTEMS AND METHODS FOR SIGNALING AND USING TRANSMIT PATTERNS

(71) Applicant: Telefonaktiebolaget LM Ericsson (publ), Stockholm (SE)

(72) Inventor: Ricardo Paredes Cabrera, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/308,177

(22) PCT Filed: Jun. 8, 2016

(86) PCT No.: PCT/IB2016/053371
§ 371 (c)(1),
(2) Date: Dec. 7, 2018

(87) PCT Pub. No.: WO2017/212314
PCT Pub. Date: Dec. 14, 2017

(65) Prior Publication Data
US 2019/0306872 A1 Oct. 3, 2019

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0082* (2013.01); *H04W 28/0278* (2013.01);
(Continued)

(58) Field of Classification Search
CPC . H04W 28/02; H04W 28/0278; H04W 72/00; H04W 72/04; H04W 72/0413;
(Continued)

(56) References Cited

U.S. PATENT DOCUMENTS 8,767,539 B2    7/2014  Paredes
8,923,271 B2 *  12/2014 Wang ................ H04W 72/1242
                                                        370/348
(Continued)

FOREIGN PATENT DOCUMENTS

EP    2237633 A1   10/2010
EP    2928252 A1   10/2015

OTHER PUBLICATIONS

Author Unknown, "Technical Specification Group Core Network and Terminals; Policy and Charging Control (PCC); Reference points (Release 13)," Technical Specification 29.212, Version 13.5.0, 3GPP Organizational Partners, Mar. 2016, 257 pages.

(Continued)

*Primary Examiner* — Tri H Phan
(74) *Attorney, Agent, or Firm* — Sage Patent Group

(57) ABSTRACT

Systems and methods relating to transmit patterns that define multiple transmit opportunities for a wireless device in a cellular communications network are disclosed. In some embodiments, a method of operation of a wireless device in a cellular communications network comprises receiving an indication of one or more transmit patterns for one or more logical channel groups. Each transmit pattern of the one or more transmit patterns defines a plurality of transmit opportunities. The method further comprises, based on the one or more transmit patterns, determining when to transmit a scheduling request for transmission of data in accordance with the one or more transmit patterns. The method further comprises, upon determining that it is time to transmit a scheduling request, transmitting a scheduling request to a radio access node to thereby request resources for transmission of uplink data in accordance with the one or more transmit patterns.

26 Claims, 20 Drawing Sheets

```
-- ASN1START

LogicalChannelConfig ::=       SEQUENCE {
    ul-SpecificParameters       SEQUENCE {
        priority                INTEGER (1..16),
        prioritisedBitRate      ENUMERATED {
                                    kBps0, kBps8, kBps16, kBps32, kBps64, kBps128,
                                    kBps256, infinity, kBps512-v1020, kBps1024-v1020,
                                    kBps2048-v1020, spare5, spare4, spare3, spare2,
                                    spare1},
        bucketSizeDuration      ENUMERATED {
                                    ms50, ms100, ms150, ms300, ms500, ms1000, spare2,
                                    spare1},
        logicalChannelGroup     INTEGER (0..3)           OPTIONAL   -- Need OR
        transmissionPatternIds  TransmissionPatternIdList OPTIONAL  -- pattern identifiers
    }   OPTIONAL,                                                   -- Cond UL
    ...,
    [[ logicalChannelSR-Mask-r9  ENUMERATED (setup)  OPTIONAL   -- Cond SRmask
    ]],
    [[ logicalChannelSR-Prohibit-r12 BOOLEAN          OPTIONAL   -- Need ON
    ]]
}

-- pattern identifiers. Identifier zero is reserved for the pattern describing
-- the overall UE behaivior.
TransmissionPatternIdList ::= SEQUENCE (SIZE (1..8)) of INTEGER (0..255)

-- ASN1STOP
```

(51) Int. Cl.
*H04W 28/02* (2009.01)
*H04W 72/08* (2009.01)
*H04W 72/14* (2009.01)

(52) U.S. Cl.
CPC ....... *H04W 72/08* (2013.01); *H04W 72/1257* (2013.01); *H04W 72/14* (2013.01); *H04W 72/1284* (2013.01)

(58) Field of Classification Search
CPC ..... H04W 72/08; H04W 72/12; H04W 72/14; H04W 72/1236; H04W 72/1257; H04W 72/1268; H04W 72/1284; H04W 74/00; H04W 74/002; H04W 74/004; H04W 88/08; H04L 5/00; H04L 5/0082
See application file for complete search history.

(56) References Cited

U.S. PATENT DOCUMENTS

| | | | |
|---|---|---|---|
| 8,995,259 B2 | 3/2015 | Paredes et al. | |
| 9,532,373 B2* | 12/2016 | Eriksson | H04W 74/085 |
| 9,756,523 B2* | 9/2017 | Zhang | H04W 72/1284 |
| 9,763,151 B2* | 9/2017 | Kim | H05K 999/99 |
| 9,913,284 B2* | 3/2018 | Larsson | H04L 47/127 |
| 9,992,773 B2* | 6/2018 | Kim | H04B 7/2656 |
| 10,111,246 B2* | 10/2018 | Zhang | H04W 28/0278 |
| 10,154,514 B2* | 12/2018 | Luo | H04W 72/1268 |
| 10,368,265 B2* | 7/2019 | Zhang | H04W 72/1284 |
| 10,531,493 B2* | 1/2020 | Zhang | H04W 74/004 |
| 10,582,527 B2* | 3/2020 | Zhang | H04W 72/1284 |
| 2011/0158108 A1* | 6/2011 | Chan | H04L 43/50 370/250 |
| 2013/0044699 A1* | 2/2013 | Eriksson | H04W 72/1289 370/329 |
| 2016/0044707 A1 | 2/2016 | Folke et al. | |
| 2018/0351656 A1* | 12/2018 | Shi | H04B 13/02 |

OTHER PUBLICATIONS

Author Unknown, "Technical Specification Group Core Network and Terminals; Evolved Packet System (EPS); Mobility Management Entity (MME) and Serving Gprs Support Node (SGSN) related interfaces based on Diameter Protocol (Release 13)," Technical Specification 29.272, Version 13.5.1, 3GPP Organizational Partners, Mar. 2016, 151 pages.

Author Unknown, "Technical Specification Group Radio Access Network; Evolved Universal Terrestrial Radio Access (E-UTRA); Medium Access Control (MAC) protocol specification (Release 13)," Technical Specification 36.321, Version 13.0.0, 3GPP Organizational Partners, Dec. 2015, 82 pages.

Author Unknown, "Technical Specification Group Radio Access Network; Evolved Universal Terrestrial Radio Access (E-UTRA); Radio Resource Control (RRC) protocol specification (Release 13)," Technical Specification 36.331, Version 13.0.0, 3GPP Organizational Partners, Dec. 2015, 507 pages.

Author Unknown, "Technical Specification Group Radio Access Network; Evolved Universal Terrestrial Radio Access Network (E-UTRAN); S1 Application Protocol (S1AP) (Release 13)," Technical Specification 36.413, Version 13.2.0, 3GPP Organizational Partners, Mar. 2016, 321 pages.

Invitation to Pay Additional Fees and Partial Search for International Application No. PCT/IB2016/053371, dated Feb. 23, 2017, 8 pages.

International Search Report and Written Opinion for International Patent Application No. PCT/IB2016/053371, dated Apr. 21, 2017, 22 pages.

\* cited by examiner

```
-- ASN1START

LogicalChannelConfig ::=          SEQUENCE {
    ul-SpecificParameters         SEQUENCE {
        priority                  INTEGER (1..16),
        prioritisedBitRate        ENUMERATED {
                                      kBps0, kBps8, kBps16, kBps32, kBps64, kBps128,
                                      kBps256, infinity, kBps512-v1020, kBps1024-v1020,
                                      kBps2048-v1020, spare5, spare4, spare3, spare2,
                                      spare1},
        bucketSizeDuration        ENUMERATED {
                                      ms50, ms100, ms150, ms300, ms500, ms1000, spare2,
                                      spare1},
        logicalChannelGroup       INTEGER (0..3)                          OPTIONAL     -- Need OR
    transmissionPatternIds        TransmissionPatternIdList    OPTIONAL   -- pattern identifiers
    }                                                                                  -- Cond UL
        OPTIONAL,
    ...,
    [[ logicalChannelSR-Mask-r9          ENUMERATED {setup}              OPTIONAL     -- Cond SRmask
    ]],
    [[ logicalChannelSR-Prohibit-r12 BOOLEAN                              OPTIONAL     -- Need ON
    ]]
}
-- pattern identifiers. Identifier zero is reserved for the pattern describing
-- the overall UE behaivior.
TransmissionPatternIdList ::=SEQUENCE (SIZE (1..8)) of INTEGER (0..255)

-- ASN1STOP
```

*FIG. 10A*

LogicalChannelConfig field descriptions

| | |
|---|---|
| *bucketSizeDuration* | Bucket Size Duration for logical channel prioritization in TS 36.321. Value in milliseconds. Value ms50 corresponds to 50 ms, ms100 corresponds to 100 ms and so on. |
| *logicalChannelGroup* | Mapping of logical channel to logical channel group for BSR reporting in TS 36.321. |
| *logicalChannelSR-Mask* | Controlling SR triggering on a logical channel basis when an uplink grant is configured. See TS 36.321. |
| *logicalChannelSR-Prohibit* | Value *TRUE* indicates that the *logicalChannelSR-ProhibitTimer* is enabled for the logical channel. E-UTRAN only (optionally) configures the field (i.e. indicates value *TRUE*) if *logicalChannelSR-ProhibitTimer* is configured. See TS 36.321. |
| *prioritisedBitRate* | Prioritized Bit Rate for logical channel prioritization in TS 36.321. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2 |
| *priority* | Logical channel priority in TS 36.321. Value is an integer. |
| *transmissionPatternIds* | Identifiers of the transmission patterns used by the logical channel in TS 36.321. Identifier zero is the pattern that describes the overall UE behaviour and it is included with the LCG if the existing UE pattern is impacted. |

*FIG. 10B*

```
-- ASN1START

RadioResourceConfigDedicated ::=    SEQUENCE {
    srb-ToAddModList                SRB-ToAddModList            OPTIONAL, -- Cond HO-Conn
    drb-ToAddModList                DRB-ToAddModList            OPTIONAL, -- Cond HO-toEUTRA
    drb-ToReleaseList               DRB-ToReleaseList           OPTIONAL, -- Need ON
    mac-MainConfig                  CHOICE {
        explicitValue                   MAC-MainConfig,
        defaultValue                    NULL
    }                                                           OPTIONAL,  -- Cond HO-toEUTRA2
    sps-Config                      SPS-Config                  OPTIONAL, -- Need ON
    physicalConfigDedicated         PhysicalConfigDedicated     OPTIONAL, -- Need ON
    ...,
    [[ rlf-TimersAndConstants-r9    RLF-TimersAndConstants-r9   OPTIONAL  -- Need ON
    ]],
    [[ measSubframePatternPCell-r10 MeasSubframePatternPCell-r10 OPTIONAL -- Need ON
    ]],
    [[ neighCellsCRS-Info-r11       NeighCellsCRS-Info-r11      OPTIONAL  -- Need ON
    ]],
    [[ naics-Info-r12               NAICS-AssistanceInfo-r12    OPTIONAL -- Need ON
    ]],
    [[ neighCellsCRS-Info-r13       NeighCellsCRS-Info-r13      OPTIONAL  -- Cond CRSIM
    ]]
    transmissionPatternList         TransmissionPatternList-r13 OPTIONAL
}
```

*FIG. 10C*

```
TransmissionPatternList-r13 ::=    SEQUENCE (SIZE (1..16)) of
TransmissionPattern TransmissionPattern ::=    SEQUENCE {
    patternId              INTEGER(0..255),           -- pattern id zero
reserved for whole UE
patterns
    patternType            PatternType    OPTIONAL,  -- defines how to combine
    patternTrigger         PatternTrigger OPTIONAL,  -- trigger when multiple
patterns present
    minInterTxDelay        INTEGER.       OPTIONAL,  -- minimum time between
transmissions
    maxInterTxDelay        INTEGER,       OPTIONAL,  -- maximum time between
transmissions
    txTimes                TxTimes,       OPTIONAL,  -- transmission slots.
    threshold              INTEGER,       OPTIONAL,  -- Resource utilization
percentage
                                                     -- for admission control
rejection
                                                     -- and for pre-emption.
    minPayloads            MinPayloads    OPTIONAL,  -- in bits
    maxPayloads            MaxPayloads    OPTIONAL,  -- in bits -- the next field is of type Unsigned8
-- Bit at position zero: value 1 => enable; value = 0 => disable this
functionality.
    applyDaysOfTheWeek     INTEGER        OPTIONAL,  -- a bits 1 to 7
represent the week days.
```

*FIG. 10D*

```
notToApplyDaysOfTheWeek    NotToApplyDaysOfTheWeek OPTIONAL,
                        -- which days of the week not to apply it -- the next field is of type Unsigned32
-- Bit at position zero: value 1 => enable; value = 0 => disable this
functionality.
  applyTimeOfTheDay         INTEGER       OPTIONAL    -- Bits 1-24 represent
the day hours
}

TxTimes       ::=      SEQUENCE (SIZE (1..50)) of INTEGER

MinPayloads   ::=      SEQUENCE (SIZE (1..50)) of INTEGER

MaxPayloads   ::=      SEQUENCE (SIZE (1..50)) of INTEGER

PatternType   ::= enum { MAIN_ONLY, MAIN_SWITCH, MAIN_ALT, MAIN_SUB,
                         SEC_SWITCH, SEC_ALT, SEC_SUB }
PatternTrigger ::= enum {INTER_PACKET_DELAY, PACKET_SIZE, DELAY_AND_SIZE,
               DELAY_OR_SIZE, SWITCH_ON_LATE_PACKET,
               SWITCH_ON_EARLY_PACKET, DISCARD_LATE_PACKETS,
               SCHEDULE_LATE_PACKETS, THRESHOLD }
```

*FIG. 10E*

TS 36.321 (V13.0.0) changes for this invention are as follows:

New section at page 31:

5.4.3.3 Logical channel group pre-scheduling and scheduling using transmission patterns Buffer Status Report Sequence Omitted When the UE receives a transmission pattern associated with a Logical Channel Group (LCG), the following procedures are followed:

If pattern with ID zero is received, replace the UE transmission pattern with the new one. The UE sets the UE grant size to the minPayloads from pattern zero. The UE also restarts the SR timer with the minInterTxDelay from pattern zero. The UE then waits for two conditions to occur to send the next SR:
1. The data in the queues has size minPayloads or larger, and
2. A minimum of minInterTxDelay period has passed since the last SR (or last transmission).
3. When the eNB receives the SR, it sends a grant of size minPayloads, avoiding this way the BSR sequence.

When the UE receives a grant, it uses the transmission patterns of each logical channel group (with identifiers > zero) to decide which LCGs will use the grant. The transmission priority is decided as follows:

1. The LCGs that have sufficient data to transmit (as defined by their minPayloads in their transmission patterns) are selected,
2. The LCGs that have exceeded their minInterTxDelay
3. The LCGs are sorted in decreasing order using timeSinceLastTransmit of each LCG as key.

*FIG. 10F*

4. The LCGs with the highest priorities (the priority signal as part of the PBR) are allocated first for transmission,
5. Each selected LCG is allocated minPayloads bits to transmit in the first pass.
6. If the grant is not fully used at this point:
   a. Revidit the list from steps 1 to 4 and allocate more resources to the LCGs that have more data to send.
   b. If b above fails to utilize the whole grant, consider any LCG with data to transmit.
7. After transmitting, reset the timer timeSinceLastTransmit of each LCG that has transmitted the minimum payload. Note that the bit rate associated with the LCG and signalled as part of the PBR can be also checked to decide if the timeSinceLastTransmit should be reset after a transmission.

*FIG. 10G*

SYSTEMS AND METHODS FOR SIGNALING AND USING TRANSMIT PATTERNS

This application is a 35 U.S.C. § 371 national phase filing of International Application No. PCT/IB2016/053371, filed Jun. 8, 2016, the disclosure of which is incorporated herein by reference in its entirety.

TECHNICAL FIELD

The present disclosure relates to uplink grant related procedures in a cellular communications network.

BACKGROUND

In the current Third Generation Partnership Project (3GPP) standards, a User Equipment node (UE) sends Scheduling Requests (SRs) at specific times when there is traffic to transmit in the uplink direction. A SR consists of one bit by which a UE notifies the enhanced or evolved Node B (eNB) that a grant is required for the UE to send a Buffer Status Report (BSR) to the eNB. A BSR indicates how much data is waiting at the UE for uplink transmission. Once the eNB receives the SR, the eNB sends a grant to the UE for a BSR. Upon receiving the grant for the BSR, the UE sends the BSR to the eNB. Once the eNB receives the BSR, the eNB allocates resources for an uplink transmission based on the BSR and transmits a grant to the UE for uplink transmission of data.

More specifically, the uplink grant related procedures are as follows. At the UE, data from the UE upper layers arrives at the Medium Access Control (MAC) layer. The MAC layer has four queues for queuing uplink traffic. Each queue is associated with a respective Logical Channel Group (LCG) which maps to one or a group of uplink radio bearers. The UE informs the serving eNB that a grant is required to send a BSR via a SR. The eNB replies to the SR with a grant large enough for the UE to send a BSR. The UE sends the BSR in accordance with the grant to inform the eNB of how much data there is waiting for transmission at the UE. The eNB replies to the BSR with a grant to allow the data transmission.

In the current uplink grant related procedures, an uplink data transmission requires going through the eNB scheduling procedures twice. In particular, for the first eNB scheduling procedure, the eNB scheduler must consider the SR and schedule the resulting BSR grant. The eNB must then perform a second scheduling procedure in which the eNB considers the BSR and schedules the resulting data grant. Each time, the SR and the BSR need to compete with regular downlink traffic and with uplink SRs and BSRs from other UEs. These two scheduling passes not only delay the uplink transmission but also put uplink scheduling at a disadvantage with respect to downlink traffic.

A common problem with this current approach is that, during congestion periods, UEs tend to overload eNBs with SRs. Since SRs compete for resources with regular traffic, the eNB may not have the resources to handle some of the SRs causing the UEs to exhaust the allowed retransmissions resulting in UEs restarting the Random Access Channel (RACH) procedures.

SUMMARY

The present disclosure relates to transmit patterns that define multiple transmit opportunities for a wireless device in a cellular communications network and the use thereof by the wireless device. In some embodiments, a method of operation of a wireless device in a cellular communications network comprises receiving an indication of one or more transmit patterns for one or more logical channel groups. Each transmit pattern of the one or more transmit patterns defines a plurality of transmit opportunities. The method further comprises, based on the one or more transmit patterns, determining when to transmit a Scheduling Request (SR) for transmission of data in accordance with the one or more transmit patterns. The method further comprises, upon determining that it is time to transmit a SR, transmitting a SR to a radio access node to thereby request resources for transmission of uplink data in accordance with the one or more transmit patterns. In some embodiments, this process enables the Buffer Status Report (BSR) procedure to be avoided, which substantially reduces signaling required for uplink scheduling.

In some embodiments, the one or more transmit patterns comprise a plurality of transmit patterns, and the method further comprises generating a combined transmit pattern for the wireless device based on the one or more transmit patterns. Further, determining when to transmit a SR comprises determining when to transmit a SR based on the combined transmit pattern.

In some embodiments, the one or more transmit patterns comprise a plurality of transmit patterns and each transmit pattern of the plurality of transmit patterns comprise a delay constraint that defines an amount of time between adjacent transmit opportunities in the plurality of transmit opportunities defined by the transmit pattern. Determining when to transmit a SR comprises determining when to transmit a SR based on a minimum delay constraint among the plurality of transmit patterns.

In some embodiments, determining when to transmit a SR comprises determining whether it is time to transmit a SR for a next transmit opportunity of the transmit opportunities defined by the one or more transmit patterns and, upon determining that it is time to transmit a SR, initiating the transmitting of the SR regardless of an amount of data that is waiting for uplink transmission. Further, in some embodiments, the method further comprises receiving a grant for transmission of a BSR in response to transmitting the SR, transmitting a BSR in accordance with the grant for transmission of the BSR where the BSR comprises an indication of the amount of data that is waiting for uplink transmission, receiving a grant for uplink transmission of data in response to transmitting the BSR, and transmitting data in accordance with the grant for uplink transmission of data.

In some embodiments, determining when to transmit a SR comprises determining whether it is time to transmit a SR for a next transmit opportunity of the one or more transmit patterns, determining whether an amount of data waiting for uplink transmission is greater than or equal to a predefined amount of data, and initiating the transmitting of the SR upon determining that it is time to transmit a SR and that the amount of data waiting for uplink transmission is greater than or equal to the predefined amount of data. In some embodiments, the method further comprises receiving a grant of an amount of resources for uplink transmission of the predefined amount of data without first transmitting a BSR to the radio access node in response to transmitting the SR and transmitting the predefined amount of data in accordance with the grant. In some embodiments, the next transmit opportunity is a next transmit opportunity defined by one of the one or more transmit patterns, and the predefined amount of data is an amount of data defined for the next transmit opportunity. In some embodiments, the one or more transmit patterns is a plurality of transmit patterns, the next transmit opportunity is a next transmit opportunity defined by a combined transmit pattern generated based on the plurality of transmit patterns, and the predefined amount of data is an amount of data defined for the next transmit opportunity in the combined transmit pattern.

In some embodiments, determining when to transmit a SR comprises determining whether an amount of data waiting for uplink transmission is greater than or equal to a predefined amount of data, determining whether it is time to transmit a SR using a predefined algorithm, and initiating the transmitting of the SR upon determining that the amount of data waiting for uplink transmission is greater than or equal to the predefined amount of data and that it is time to transmit a SR.

In some embodiments, determining when to transmit a SR comprises determining whether it is time to transmit a SR for a next transmit opportunity of the one or more transmit patterns, determining an amount of data waiting for uplink transmission, and initiating the transmitting of the SR upon determining that it is time to transmit a SR, where the SR provides an indication of the amount of data waiting for uplink transmission. In some embodiments, the indication of the amount of data waiting for uplink transmission is an implicit indication. In some embodiments, the implicit indication is a transmit time interval in which the SR is transmitted, wherein the transmit time interval has a predefined association with a predefined amount of data. In some other embodiments, the indication of the amount of data waiting for uplink transmission is an explicit indication.

In some embodiments, each transmit opportunity of the plurality of transmit opportunities is an opportunity for uplink transmission of a defined amount of data from the wireless device at a defined time. Further, in some embodiments, for each transmit pattern of the one or more transmit patterns, the defined amount of data is the same for each of the plurality of transmit opportunities defined for the transmit pattern.

Embodiments of a wireless device for operation in a cellular communications network are also disclosed. In some embodiments, the wireless device is adapted to receive an indication of one or more transmit patterns for one or more logical channel groups, wherein each transmit pattern of the one or more transmit patterns defines a plurality of transmit opportunities. The wireless device is further adapted to, based on the one or more transmit patterns, determine when to transmit a SR for transmission of data in accordance with the one or more transmit patterns. The wireless device is further adapted to, upon determining that it is time to transmit a SR, transmit a SR to a radio access node to thereby request resources for transmission of uplink data in accordance with the one or more transmit patterns.

In some embodiments, the wireless device is further adapted to perform the method of operation of a wireless device according to any of the embodiments disclosed herein.

In some embodiments, a wireless device for operation in a cellular communications network comprises at least one transceiver, at least one processor, and memory storing instructions executable by the at least one processor whereby the wireless device is operable to: receive an indication of one or more transmit patterns for one or more logical channel groups, wherein each transmit pattern of the one or more transmit patterns defines a plurality of transmit opportunities; based on the one or more transmit patterns, determine when to transmit a SR for transmission of data in accordance with the one or more transmit patterns; and, upon determining that it is time to transmit a SR, transmit a SR to a radio access node to thereby request resources for transmission of uplink data in accordance with the one or more transmit patterns.

In some embodiments, a wireless device for operation in a cellular communications network comprises a receiving module operable to receive an indication of one or more transmit patterns for one or more logical channel groups, wherein each transmit pattern of the one or more transmit patterns defines a plurality of transmit opportunities. The wireless device further comprises a determining module operable to, based on the one or more transmit patterns, determine when to transmit a SR for transmission of data in accordance with the one or more transmit patterns. The wireless device further comprises a transmitting module operable to, upon determination that it is time to transmit a SR by the determining module, transmit a SR to a radio access node to thereby request resources for transmission of uplink data in accordance with the one or more transmit patterns.

Embodiments of a method of operation of a base station in a cellular communications network are also disclosed. In some embodiments, the method of operation of a base station comprises transmitting, to a wireless device, an indication of one or more transmit patterns for one or more logical channel groups, wherein each transmit pattern of the one or more transmit patterns defines a plurality of transmit opportunities. The method further comprises receiving a SR from the wireless device that requests resources for a transmission of uplink data from the wireless device in accordance with the one or more transmit patterns.

In some embodiments, the method further comprises transmitting, to the wireless device, a grant for transmission of a BSR in response to receiving the SR, receiving a BSR from the wireless device in accordance with the grant for transmission of the BSR where the BSR comprises an indication of an amount of data that is waiting for uplink transmission, transmitting a grant for uplink transmission of data in response to receiving the BSR, and receiving data from the wireless device in accordance with the grant for uplink transmission of data.

In some embodiments, the method further comprises, in response to receiving the SR, transmitting, to the wireless device, a grant of an amount of resources for uplink transmission of a predefined amount of data without first obtaining a BSR from the wireless device. Further, in some embodiments, the predefined amount of data is an amount of data defined for a next transmit opportunity of the plurality of transmit opportunities defined by one of the one or more transmit patterns. In some other embodiments, the one or more transmit patterns is a plurality of transmit patterns, and the predefined amount of data is an amount of data defined for a next transmit opportunity in a combined transmit pattern, the combined transmit pattern being a combination of the plurality of transmit patterns.

In some embodiments, the SR comprises an indication of an amount of data waiting at the wireless device to be transmitted, and the method further comprises transmitting, to the wireless device, a grant for an amount of resources that is sufficient for uplink transmission of the amount of data indicated by the SR. In some embodiments, the indication of the amount of data waiting for uplink transmission is an implicit indication. In some embodiments, the implicit indication is a Transmit Time Interval (TTI) in which the SR is transmitted, wherein the TTI has a predefined association with a predefined amount of data. In some other embodiments, the indication of the amount of data waiting for uplink transmission is an explicit indication.

In some embodiments, each transmit opportunity of the plurality of transmit opportunities is an opportunity for uplink transmission of a defined amount of data from the wireless device at a defined time. Further, in some embodiments, for each transmit pattern of the one or more transmit patterns, the defined amount of data is the same for each of the plurality of transmit opportunities defined for the transmit pattern.

Embodiments of a base station for operation in a cellular communications network are also disclosed, the base station adapted to transmit, to a wireless device, an indication of one or more transmit patterns for one or more logical channel groups, wherein each transmit pattern of the one or more transmit patterns defines a plurality of transmit opportunities. The base station is further adapted to receive a SR from the wireless device that requests resources for a transmission of uplink data from the wireless device in accordance with the one or more transmit patterns.

In some embodiments, the base station is further adapted to perform the method of operation of a base station according to any of the embodiments disclosed herein.

In some embodiments, a base station for operation in a cellular communications network comprises at least one transmitter and at least one receiver, at least one processor, and memory storing instructions executable by the at least one processor whereby the base station is operable to transmit, to a wireless device, an indication of one or more transmit patterns for one or more logical channel groups where each transmit pattern of the one or more transmit patterns defines a plurality of transmit opportunities and receive a SR from the wireless device that requests resources for a transmission of uplink data from the wireless device in accordance with the one or more transmit patterns.

In some embodiments, a base station for operation in a cellular communications network comprises a transmitting module operable to transmit, to a wireless device, an indication of one or more transmit patterns for one or more logical channel groups, wherein each transmit pattern of the one or more transmit patterns defines a plurality of transmit opportunities. The base station further comprises a receiving module operable to receive a SR from the wireless device that requests resources for a transmission of uplink data from the wireless device in accordance with the one or more transmit patterns.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 10A to 10G illustrate an extension of the LogicalChannelConfig Information Element of the RRCConnectionReconfiguration message to include a number of transmit pattern Identifiers (IDs) (transmissionPatternIds);

DETAILED DESCRIPTION

Figure 1:
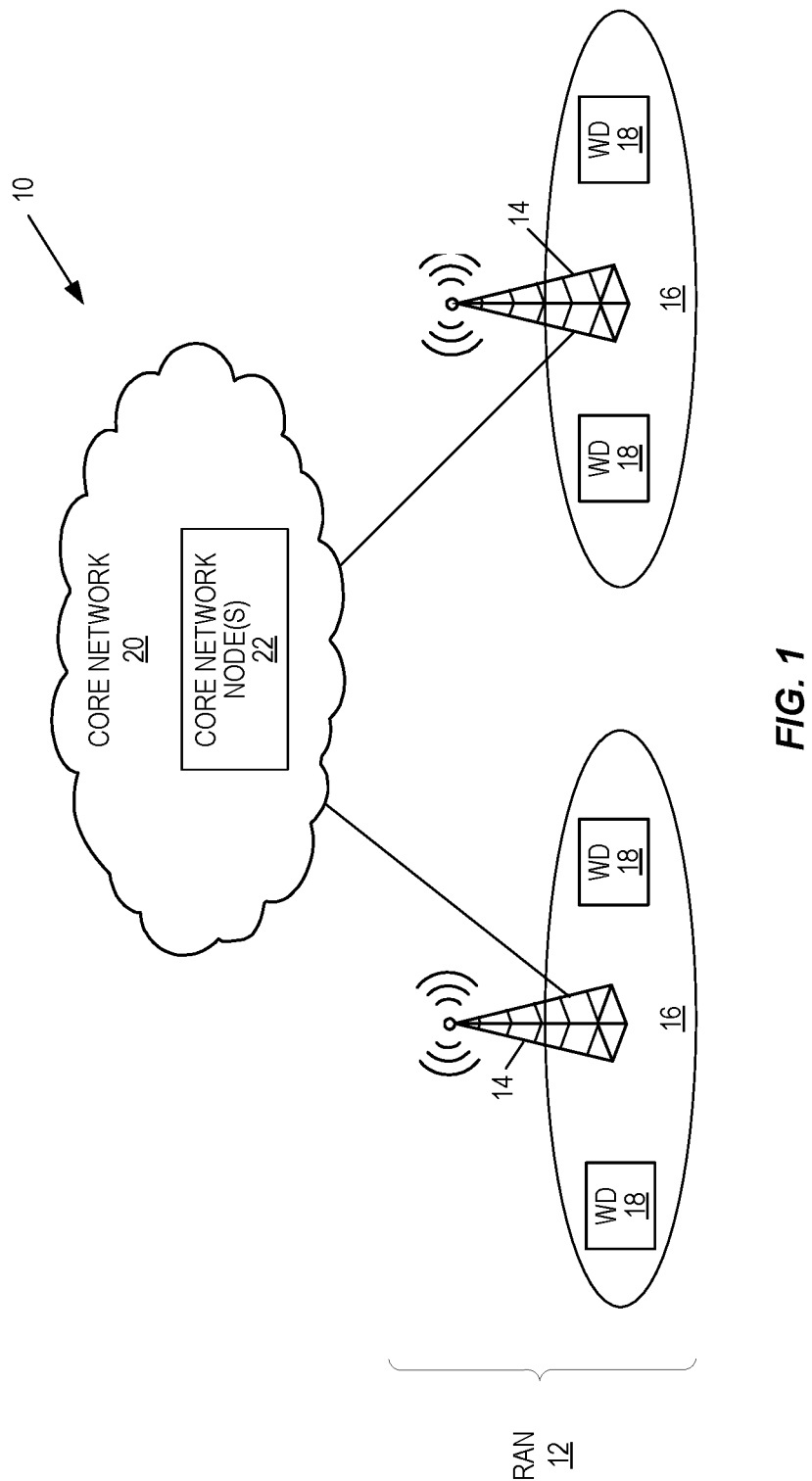
FIG. 1 illustrates one example of a cellular communications network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Transmit Pattern: As used herein, a "transmit pattern" is a pattern that includes multiple transmit opportunities. A transmit pattern defines the timing of the transmit opportunities. In addition, in some embodiments, the transmit pattern defines an amount of data that is pre-allocated (i.e., expected to be transmitted) in each of the transmit opportunities. In some embodiments, the transmit opportunities are periodic (i.e., occur every p milliseconds, where p is explicitly or implicitly defined by the transmit pattern). In other embodiments, the transmit pattern is a downlink transmit pattern or an uplink transmit pattern or a combination of both. Two or more transmit patterns can be combined to describe Logical Channel Group (LCG) transmit patterns. In this case, some transmit patterns may be active while some may not. For example, a transmit pattern may describe data packets (voice packets) while a second transmit pattern may describe the silence packets. The transmit pattern to use in this case depends on triggers such as, e.g., packet size and inter-packet delay.

Transmit Opportunity: As used herein, a "transmit opportunity" is one or more Transmit Time Intervals (TTIs) or subframes in which a wireless device may be scheduled in either the downlink or the uplink. For example, a wireless device may request resources for an uplink transmit opportunity or be allocated resources for a downlink transmit opportunity in accordance with an uplink or downlink transmit pattern.

Quality of Service (QoS) Pattern: As used herein, a "QoS pattern" is a pattern that describes the QoS requirements independent of the resources of the link or interface to use the pattern.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Embodiments of the present disclosure relate to simplifying Scheduling Request (SR), Buffer Status Report (BSR), and grant allocation procedures at the wireless device side by the use of transmit patterns. In some embodiments, the transmit patterns are formed based on QoS requirements (e.g., bit rate requirement and latency requirement), where the QoS requirements can be expressed as a QoS pattern (e.g., requirement for transmission of b bits every p milliseconds). In some embodiments, the BSR procedure can be completely omitted when the transmit patterns sent by base stations (e.g., eNBs) to the wireless devices (e.g., UEs) contain or otherwise indicate information such as an amount of data that is pre-allocated or pre-scheduled for transmission at each transmit occurrence in the transmit pattern and an amount of time (e.g., a minimum delay) between transmit opportunities in the transmit patterns. At least some embodiments of the present disclosure increase the capacity of the cell and the capacity of the base station as a whole.

The present disclosure relates to transmit patterns that define multiple transmit opportunities for a wireless device in a cellular communications network and/or the use thereof by the wireless device. In this regard, FIG. 1 illustrates one example of a cellular communications network 10 in which embodiments of the present disclosure may be implemented. As illustrated, the cellular communications network 10 includes a Radio-Access Network (RAN) 12 that includes a number of radio access nodes. In this example, the radio access nodes are base stations 14 (e.g., LTE eNBs). The base stations 14 serve corresponding cells 16. Wireless devices 18 (e.g., LTE UEs) transmit and receive wireless, or radio, signals to and from the base stations 14. While not illustrated, the base stations 14 may communicate with one another via a base-station-to-base-station interface (e.g., an LTE X2 interface). The base stations 14 are connected to a core network 20, which includes one or more core network nodes 22 (e.g., MMEs, Serving Gateways (S-GWs), P-GWs, etc.).

Figure 2:
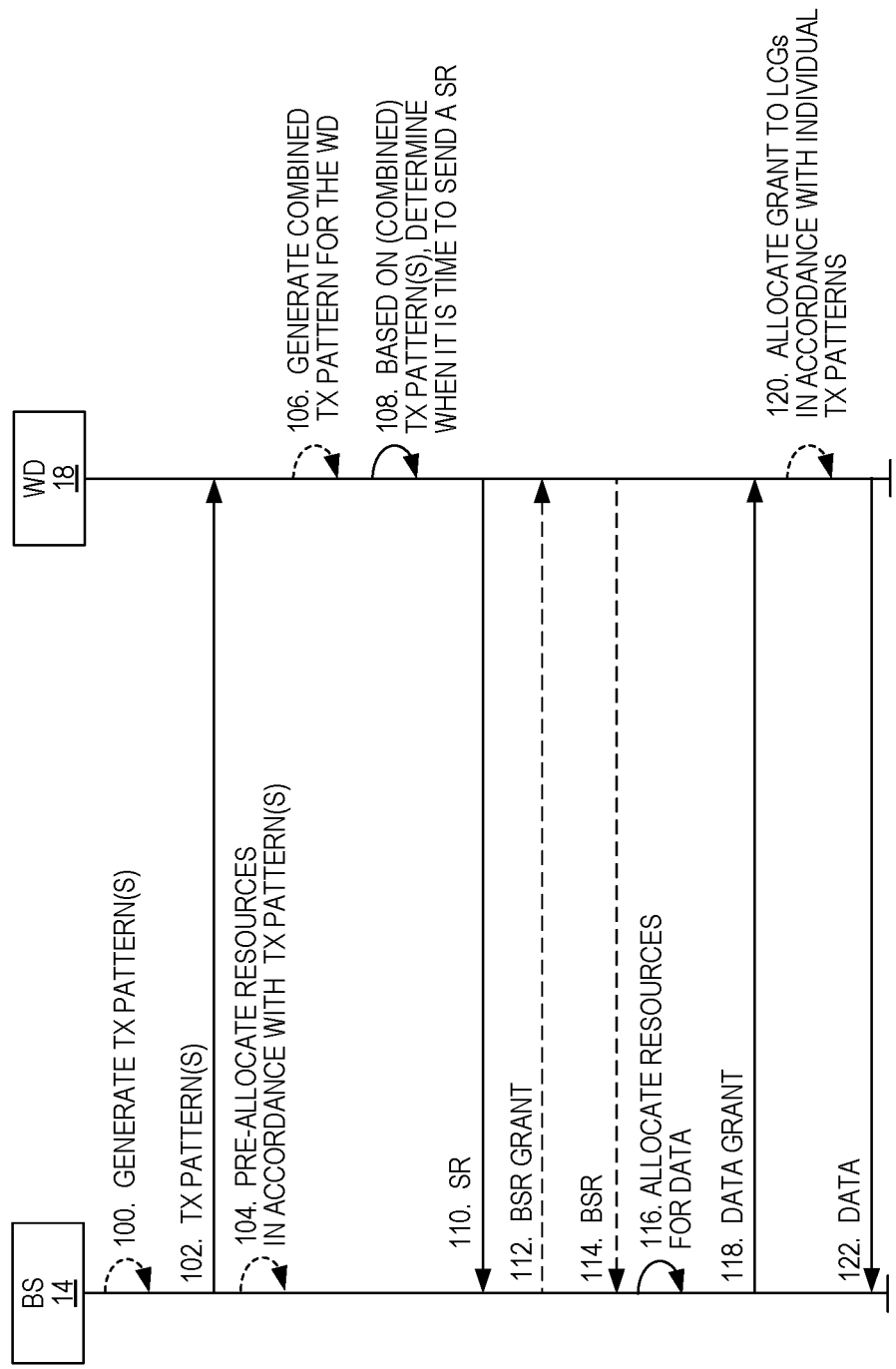
FIG. 2 illustrates the operation of a base station and a wireless device according to some embodiments of the present disclosure.

FIG. 2 illustrates the operation of one of the base stations 14 and one of the wireless devices 18 according to some embodiments of the present disclosure. Note that while processes are described herein as including "steps," the "steps" may be performed in any suitable order unless explicitly stated or otherwise required. Further, optional steps are indicated by dashed lines. As illustrated in FIG. 2, the base station 14 optionally generates one or more transmit patterns for the wireless device 18 (step 100). Alternatively, the base station 14 may obtain the transmit pattern(s) for the wireless device 18 from an external source, e.g., another network node. In some embodiments, whether the transmit pattern(s) is generated by the base station 14 or some other node, the transmit pattern(s) for the wireless device 18 is generated based on QoS requirements of the wireless device 18, one or more applications or services (e.g., Voice over LTE (VoLTE), file download, default access, etc.) of the wireless device 18, or the like, or any combination thereof. For example, the QoS requirements for a radio bearer group (e.g., a LCG, which may include one or more radio bearers) can be used to derive a QoS pattern (e.g., b bits every p milliseconds) for the group. The QoS pattern for the radio bearer group can then be used to generate a transmit pattern for the group (e.g., b bits every p milliseconds starting at time t).

The base station 14 transmits an indication of the transmit pattern(s) to the wireless device 18 (step 102). This indication may be transmitted, e.g., during bearer setup/creation and during bearer modification/deletion. In some embodiments, the transmit pattern(s) is(are) for a respective radio bearer group. Thus, for multiple radio bearer groups, a separate transmit pattern may be indicated for each group. In some embodiments, a separate transmit pattern may be indicated for each radio bearer group required to run one or more services and/or applications at a wireless device. In other embodiments, a number of transmit patterns are pre-defined (e.g., by standard), and the indication comprises an index or indices of the transmit pattern(s) for the wireless device 18. In some other embodiments, the indication includes information that defines the transmit pattern(s). The information that defines the transmit pattern(s) may include, for example, timing information that defines the timing of transmit opportunities (e.g., subframes or TTIs that correspond to the transmit opportunities) in the transmit pattern and information that defines an amount of data that is expected to be transmitted in each of the transmit opportunities, where the same amount of data may be defined for all transmit opportunities in a particular pattern or different amounts of data may be defined for different transmit opportunities in a particular transmit pattern.

In some embodiments, each transmit pattern is associated with a respective LCG. A LCG is a group of logical channels identified by a unique LCG Identifier (ID). In LTE, the mapping of logical channels to an LCG is set up during Radio Resource Control (RRC) configuration. Currently, LTE uses four LCGs, and each logical channel (or radio bearer) is assigned to a LCG. A logical channel is defined by the type of information that is transferred. Logical channels are generally classified into two groups, namely, control channels that are used for the transfer of control-plane information and data or traffic channels used for the transfer of user-plane information/data. LCGs are a mechanism by which, e.g., BSRs can be transmitted more efficiently (i.e., a BSR reports aggregate bits across all logical channels of an LCG).

As an example, there may be three transmit patterns for three LCGs, respectively, where the three LCGs can be referred to as LCG 1, LCG 2, and LCG 3. The transmit pattern for LCG 1 defines periodic transmit opportunities at a periodicity of $p_1$ milliseconds (i.e., a transmit opportunity occurs every $p_1$ milliseconds), where each transmit opportunity is an opportunity to transmit $b_1$ bits. Thus, the transmit pattern for LCG 1 defines a transmit opportunity for $b_1$ bits every $p_1$ milliseconds. The transmit pattern for LCG 1 also includes a starting time for the transmit pattern. In a similar manner, the transmit pattern for LCG 2 defines periodic transmit opportunities at a periodicity of $p_2$ milliseconds (i.e., a transmit opportunity occurs every $p_2$ milliseconds), where each transmit opportunity is an opportunity to transmit $b_2$ bits. Thus, the transmit pattern for LCG 2 defines a transmit opportunity for $b_2$ bits every $p_2$ milliseconds. The transmit pattern for LCG 2 also includes a starting time for the transmit pattern. In a similar manner, the transmit pattern for LCG 3 defines periodic transmit opportunities at a periodicity of $p_3$ milliseconds (i.e., a transmit opportunity occurs every $p_3$ milliseconds), where each transmit opportunity is an opportunity to transmit $b_3$ bits. Thus, the transmit pattern for LCG 3 defines a transmit opportunity for $b_3$ bits every $p_3$ milliseconds. The transmit pattern for LCG 3 also includes a starting time for the transmit pattern. The values of $b_1$ to $b_3$ and $p_1$ to $p_3$ may be selected or otherwise determined based on, for example, QoS requirements (e.g., bit rate and maximum delay requirements) for the LCGs. Further, note that the periodicity of a transmit pattern is also referred to herein as a delay constraint in that it defines the delay between transmit opportunities in the transmit pattern.

Optionally, the base station 14 pre-allocates resources in accordance with the transmit pattern(s) of the wireless device 18 (step 104). For example, the base station 14 may pre-allocate resources in accordance with the transmit pattern(s) as if the base station 14 expects to receive scheduling requests from the wireless device 18 for all of the transmit opportunities even though the wireless device 18 may not transmit SRs for all of the transmit opportunities, depending on conditions at the wireless device 18. In some embodiments, for the uplink case, the base station 14 pre-allocates resources for the wireless device 18 by building the uplink transmit patterns with specific inter-transmission delays and transmission sizes. The transmit patterns can be applied in two ways. In a first way, the base station 14 maps a transmit pattern to actual frame offset or subframe numbers to start the pattern and the repeat it. In this case the transmit pattern must be used only at specific frame offsets. In a second way, the transmit pattern is independent of actual subframe numbers. In this case, the wireless device 18 must comply with the requirements such as delays between transmissions, but it is free to use any sub-frame(s).

Figure 3:
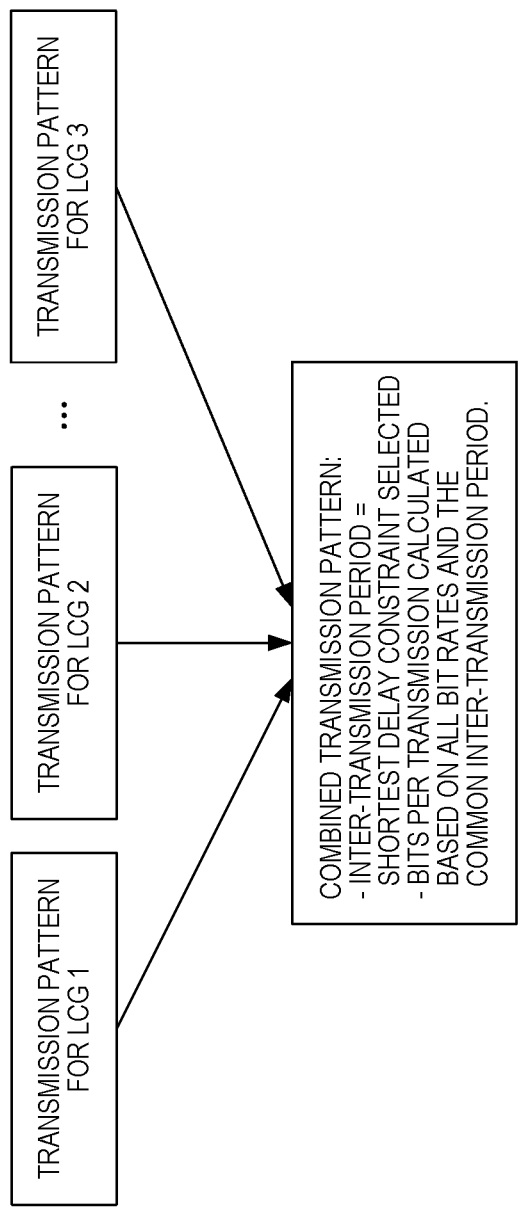
FIG. 3 illustrates generation of a combined transmit pattern for a wireless device according to some embodiments of the present disclosure.

In some embodiments, there are two or more transmit patterns (e.g., one transmit pattern for each of multiple LCGs), and the wireless device 18 optionally (i.e., in some embodiments) generates a combined transmit pattern for the wireless device 18 based on the transmit patterns (step 106). Generation of the combined transmit pattern for the wireless device 18 for N LCGs, where N≤2, according to some embodiments of the present disclosure is illustrated in FIG. 3. As illustrated in FIG. 3, the combined transmit pattern for the wireless device 18 includes a periodicity (i.e., inter-transmission period) that is equal to the shortest delay constraint (i.e., the shortest periodicity of the transmit patterns for LCG 1 to LCG N) and a bits per transmit opportunity that is calculated based on the bit rate requirements for LCG 1 to LCG N and the periodicity of the combined transmit pattern.

As an example, assume that LCG 1 has a bit rate requirement of 64 kilobits per second (kbps) and a maximum delay requirement of 60 milliseconds (ms) (which can be referred to as QoS requirements that define a QoS pattern). Thus, the individual transmit pattern for LCG 1 defines transmit opportunities for 64*60=3,840 bit transmissions at a periodicity of 60 ms, where the transmit pattern for LCG 1 preferably indicates or otherwise defines the timing (e.g., TTIs or subframes) at which the transmit opportunities occur. Also, assume that LCG 2 has a bit rate requirement of 384 kbps and a maximum delay requirement of 33 ms. Thus, the individual transmit pattern for LCG 2 defines transmit opportunities for 384*33=12,672 bit transmissions at a periodicity of 33 ms, where the transmit pattern for LCG 2 preferably indicates or otherwise defines the timing (e.g., TTIs or subframes) at which the transmit opportunities occur. Lastly, assume that LCG 3 has a bit rate requirement of 15 kbps and a maximum delay requirement of 22 ms. Thus, the individual transmit pattern for LCG 3 defines transmit opportunities for 15*22=330 bit transmissions at a periodicity of 22 ms, where the transmit pattern for LCG 3 preferably indicates or otherwise defines the timing (e.g., TTIs or subframes) at which the transmit opportunities occur. The periodicity for the combined transmit pattern is the minimum periodicity (i.e., the minimum delay constraint) from among the individual transmit patterns for LCG 1 through LCG 3, which in this example is 22 ms. Then, using a 22 ms periodicity, the number of bits needed per transmission at the periodicity of 22 ms for each of the LCGs can be calculated as follows:

LCG 1 at 22 ms transmissions: 64*22=1,408 bits per transmission at 22 ms periodicity.

LCG 2 at 22 ms transmissions: 384*22=8,448 bits per transmission at 22 ms periodicity.

LCG 3 at 22 ms transmissions: 330 bits at 22 ms per transmission at 22 ms periodicity.

Thus, the combined transmit pattern for the wireless device 18 in this example defines transmit opportunities for 1,408+8,448+330=10,186 bits at a periodicity of 22 ms. The maximum delay between transmissions in the combined transmit pattern is 22 ms (i.e., the shortest requirement from among the individual transmit patterns of all of the LCGs). Thus, when using the combined transmit pattern, the wireless device 18 is permitted to request a grant of 10,186 bits every 22 ms. The timing of the transmit opportunities for the combined transmit pattern may, for example, be the same as the timing of the transmit opportunities for, in this example, the individual transmit pattern for LCG 3 (i.e., the same timing as for the individual transmit pattern having the minimum delay constraint).

Returning to FIG. 2, the wireless device 18 determines when it is time to transmit a SR based on the individual transmit pattern(s) indicated in step 102 or, more specifically in some embodiments, the combined transmit pattern generated in step 106 (step 108). Note that the decision of step 108 is, at least in some embodiments, triggered when there is some amount of data stored in an uplink buffer at the wireless device 18 (i.e., the decision process of step 108 may not need to be performed if there is no data in the buffer waiting for transmission).

As described below in detail, looking at a particular transmit pattern (which may be an individual transmit pattern or a combined transmit pattern depending on the embodiment), the transmit pattern defines times at which the wireless device 18 can transmit SRs. For example, if the transmit pattern defines transmit opportunities at a periodicity p, then the wireless device 18 decides whether or not to transmit SRs at the same or similar periodicity. In other words, the wireless device 18 decides whether or not to transmit a SR to be allocated resources for each transmit opportunity defined by the transmit pattern. So, prior to each transmit opportunity, the wireless device 18 decides whether to transmit a SR to be allocated resources for the transmit opportunity. If the wireless device 18 decides to transmit a SR, the wireless device 18 transmits a SR to the base station 14 to thereby request resources for the transmit opportunity (step 110).

Optionally (i.e., in some embodiments), the base station 14 transmits a BSR grant to the wireless device 18 upon receiving the SR in step 110 (step 112). In response, the wireless device 18 transmits a BSR to the base station 14 (step 114). The base station 14 allocates resources for the uplink transmission from the wireless device 18 (step 116) and transmits a data grant to the wireless device (step 118). Note that, in some embodiments since the base station 14 pre-allocates resources for the wireless device 18 in accordance with the transmit pattern(s), the base station 14 is enabled to promptly allocate and grant the resources for the wireless device 14 and there should not be a need for SR retransmissions. However, if there is a need for a SR retransmission, the wireless device 18 can wait until the next transmit opportunity instead of flooding the base station 14 with SR retransmissions for the same transmit opportunity.

More specifically, in some embodiments, the wireless device 18 sends the SR in step 110 regardless of the amount of data waiting to be transmitted at the wireless device 18. Thus, in some scenarios, the amount of data waiting to be transmitted may be substantially less (or more) than that expected for the transmit opportunity. For example, the transmit pattern may indicate that the transmit opportunity is for 10,186 bits, but the amount of data in the buffer may be only 500 bits. In this case, the BSR procedure of steps 112 and 114 may be beneficial such that a proper amount of resources are allocated and granted in steps 116 and 118 (i.e., such that the amount of resources allocated and granted is that which is needed for the amount of data actually waiting to be transmitted at the wireless device 18). However, in other embodiments, the wireless device 18 only transmits the SR in step 110 if the amount of data waiting to be transmitted at the wireless device 18 is greater than or equal to (or at least approximately equal to) the amount of data defined for the transmit opportunity in the transmit pattern. In this case, the BSR procedure may be avoided such that the base station 14 considers the SR in step 110 as a request for an amount of resources sufficient for the wireless device 18 to transmit the full amount of data defined for the transmit opportunity in the transmit pattern, in which case the base station 14 will automatically allocate and grant (in steps 116 and 118) an amount of resources sufficient for the wireless device 18 to transmit the amount of data defined for the transmit opportunity in the transmit pattern. Avoiding the BSR procedure is beneficial in that signaling is reduced.

Upon receiving the data grant, optionally (in some embodiments), the wireless device 18 allocates the granted resources to the LCGs in accordance with their individual transmit patterns (step 120). In particular, if the wireless device 18 made the decision to transmit the SR in step 108 based on the combined transmit pattern for the wireless device 18, it may then be beneficial for the wireless device 18 to allocate the resulting granted resources to the different LCGs in accordance with their individual transmit patterns (or similarly based on their individual QoS requirements (e.g., bit rate and maximum delay requirements)). The wireless device 18 transmits data in accordance with the data grant (step 122).

As one example, individual transmit patterns are defined for multiple LCGs, and the wireless device 18 calculates a delay budget for each LCG as follows:

$$LCG[i].delayBudget = LCG[i].pattern.delay - (CurrentTTI - LCG[i].LastTransmissionTTI).$$

LCG[i].delayBudget is the delay budget for the i-th LCG, LCG[i].pattern.delay is the delay between transmit opportunities in the transmit pattern for the i-th LCG, CurrentTTI is the current TTI, and LCG[i].LastTransmissionTTI is the TTI in which a transmission for the i-th LCG was last transmitted. The wireless device 18 selects the LCG(s) to which to allocate the granted resources in increasing order of their delay budget, starting with the smallest value. If two LCGs have the same delay budget, the wireless device 18 may use priorities associated with the LCGs (e.g., from priority field from Prioritized Bit Rate (PBR) parameters) to break the tie. PBR parameters include: (1) priority, which is used to decide which LCG to which to allocate a grant, (2) bit rate, which is used to check which LCG is falling below the expected bit rate, and (3) bucket size duration, which is how much to buffer for a LCG. The PBR parameters are signaled to the wireless device 18 when the LCG is being set up. If there is still a tie (i.e., if the LCGs have the same delay budgets and the same priority), the wireless device 18 allocates each of the LCGs in the tie up to the amount of resources defined for the transmit opportunity in the transmit pattern. If there are any remaining resources from the grant, the wireless device 18 allocates these resources to the next LCGs. The wireless device 18 then transmits data for the LCGs according to their allocations.

It should be noted that while the generation of the transmit pattern(s) (step 100) and the transmission of the indication of the transmit pattern(s) are described with respect to the process of FIG. 2, the present disclosure is not limited thereto. In particular, in some embodiments, the generation of the transmit pattern(s) and/or the transmission of the indication of the transmit pattern(s) may be performed independently from the rest of the process of FIG. 2 (i.e., in some embodiments, steps 104-122 are optional). Further, while the transmit pattern(s) are generated by the base station 14 and signaled from the base station 14 to the wireless device 18 in the example of FIG. 2, the present disclosure is not limited thereto. For example, the transmit pattern(s) may be generated by some other network node and, e.g., signaled to the base station 14 for subsequent signaling to the wireless device 18 or signaled from the network node to the wireless device 18 (e.g., via a connection that passes through the base station 14).

FIGS. 4 through 8 are flow charts that illustrate example embodiments of the decision in step 108 of FIG. 2. Note that in embodiments where the decision in step 108 is based on a combined transmit pattern for the wireless device 18, then these processes are performed based on the combined transmit pattern (and potentially any individual transmit patterns that are not included in the combined transmit pattern due to, e.g., configuration). However, in other embodiments, the decision in step 108 is based on an individual transmit pattern for, e.g., a respective LCG. In these cases, the decision in step 108, and thus the processes of FIGS. 4 through 8, may be performed separately for each individual transmit pattern.

Figure 4:
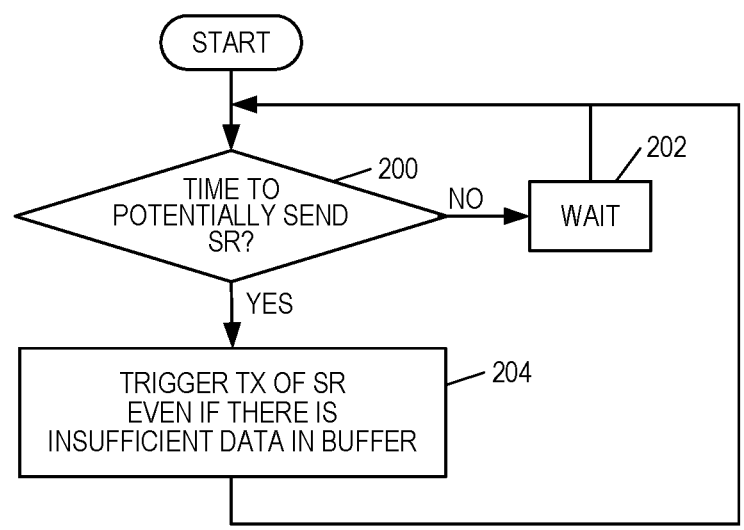
FIGS. 4 through 8 illustrate various embodiments of a decision process by which a wireless device determines when it is time to transmit a Scheduling Request (SR) based on a (combined) transmit pattern(s)

Looking first at FIG. 4, in this embodiment, the wireless device 18 determines whether it is time to potentially transmit a SR (step 200). As noted above, in some embodiments, the process is performed based on a combined transmit pattern. In other embodiments, the process is performed based on an individual transmit pattern. The transmit pattern (either a combined transmit pattern or an individual transmit pattern) defines multiple transmit opportunities and the times at which these multiple transmit opportunities occur. In step 200, the wireless device 18 determines whether it is time to transmit a SR to request resources for a next, or upcoming, transmit opportunity in the transmit pattern, if so desired by the wireless device 18. For example, if the transmit pattern defines transmit opportunities for the transmission of b bits every p milliseconds and if a SR for a transmit opportunity must be transmitted X milliseconds prior to that transmit opportunity, then the wireless device 18 may use a timer $t_{SR}$ that expires every p milliseconds for the decision in step 200, where the timer $t_{SR}$ expires X milliseconds prior to each transmit opportunity in the combined transmit pattern. If it is not time to transmit a SR for the next transmit opportunity, the wireless device 18 waits (step 202).

In this embodiment, once it is time to transmit a SR (and assuming that there is some amount of data in the buffer waiting for transmission), the wireless device 18 triggers the transmission of a SR (i.e., triggers step 110 of FIG. 2) even if there is insufficient data in the uplink buffer at the wireless device 18 waiting to be transmitted (step 204). In this context, "insufficient data" refers to an amount of data that is less than that defined for the transmit opportunity in the transmit pattern. Note that, in this embodiment, the BSR procedure of steps 112 and 114 of FIG. 2 may be beneficial so that the base station 14 may determine an amount of resources to allocate for the wireless device 18 that is appropriate for the amount of data in the buffer waiting to the transmitted at the wireless device 18.

Figure 5:
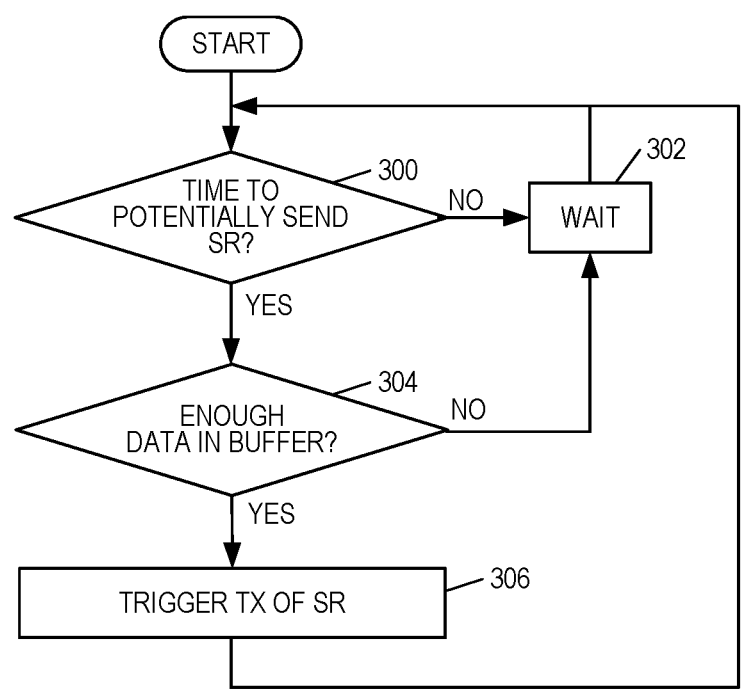

FIG. 5 illustrates an embodiment of the decision in step 108 of FIG. 2 according to some other embodiments of the present disclosure in which transmission of a SR is not triggered unless there is enough data in the buffer at the wireless device 18 waiting to be transmitted. As illustrated, the wireless device 18 determines whether it is time to potentially transmit a SR (step 300). As noted above, in some embodiments, the process is performed based on a combined transmit pattern. In other embodiments, the process is performed based on an individual transmit pattern. The transmit pattern (either a combined transmit pattern or an individual transmit pattern) defines multiple transmit opportunities and the times at which these multiple transmit opportunities occur. In step 300, the wireless device 18 determines whether it is time to transmit a SR to request resources for a next, or upcoming, transmit opportunity in the transmit pattern, if so desired by the wireless device 18. For example, if the transmit pattern defines transmit opportunities for the transmission of b bits every p milliseconds and if a SR for a transmit opportunity must be transmitted X milliseconds prior to that transmit opportunity, then the wireless device 18 may use a timer $t_{SR}$ that expires every p milliseconds for the decision in step 300, where the timer $t_{SR}$ expires X milliseconds prior to each transmit opportunity in the combined transmit pattern. If it is not time to transmit a SR for the next transmit opportunity, the wireless device 18 waits (step 302).

In this embodiment, once it is time to potentially transmit a SR, the wireless device 18 also determines whether there is enough, or a sufficient amount, of data in the buffer at the wireless device 18 waiting to be transmitted (step 304). In this context, "enough data" or "a sufficient amount of data" refers to an amount of data that is greater than or equal to (or at least approximately or nearly equal to) the amount of data defined for the next transmit opportunity in the transmit pattern. If there is not enough data in the buffer, then the wireless device 18 waits for the next transmit opportunity.

If there is enough data in the buffer, the wireless device 18 triggers the transmission of a SR (i.e., triggers step 110 of FIG. 2) (step 306). Note that, in this embodiment, the BSR procedure of steps 112 and 114 of FIG. 2 may be avoided. In particular, because the SR is transmitted only if there is enough data in the buffer waiting to be transmitted, the SR can be viewed by the base station 14 as a request for an amount of resources that is sufficient for the wireless device 18 to transmit the amount of data defined for the transmit occurrence in the transmit pattern. As such, a BSR is not needed. However, in some alternative embodiments, the BSR procedure may be performed.

Figure 6:
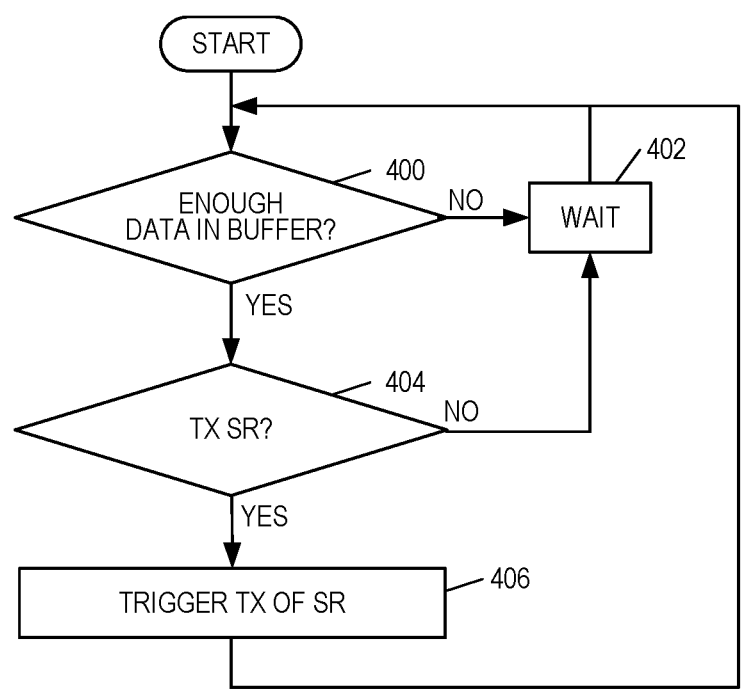

FIG. 6 illustrates an embodiment of the decision in step 108 of FIG. 2 according to some other embodiments of the present disclosure. As noted above, in some embodiments, the process is performed based on a combined transmit pattern. In other embodiments, the process is performed based on an individual transmit pattern. The transmit pattern (either a combined transmit pattern or an individual transmit pattern) defines multiple transmit opportunities and the times at which these multiple transmit opportunities occur. As illustrated, the wireless device 18 determines whether there is enough, or a sufficient amount, of data in the buffer at the wireless device 18 waiting to be transmitted (step 400). In this context, "enough data" or "a sufficient amount of data" refers to an amount of data that is greater than or equal to (or at least approximately or nearly equal to) the amount of data defined for the next transmit opportunity in the transmit pattern. If there is not enough data in the buffer, then the wireless device 18 waits until there is enough data in the buffer (step 402).

If there is enough data in the buffer, the wireless device 18 determines whether to trigger transmission of a SR (i.e., determines whether to trigger step 110 of FIG. 2) based on some predefined algorithm (step 404). For example, the predefined algorithm may be an algorithm in which the SR resource is a periodic resource allocated by the base station 14 for the wireless device 18. As an example, the SR resource may have a periodicity of, e.g., 5 ms and the wireless device 18 may have the choice of sending a SR every 5 ms. If not, the wireless device 18 continues to wait. Once the wireless device 18 determines that a SR should be triggered, the wireless device 18 triggers the transmission of a SR (i.e., triggers step 110 of FIG. 2) (step 406). Note that, in this embodiment, the BSR procedure of steps 112 and 114 of FIG. 2 may be avoided. In particular, because the SR is transmitted only if there is enough data in the buffer waiting to be transmitted, the SR can be viewed by the base station 14 as a request for an amount of resources that is sufficient for the wireless device 18 to transmit the amount of data defined for the transmit occurrence in the transmit pattern. As such, a BSR is not needed. However, in some alternative embodiments, the BSR procedure may be performed.

Figure 7:
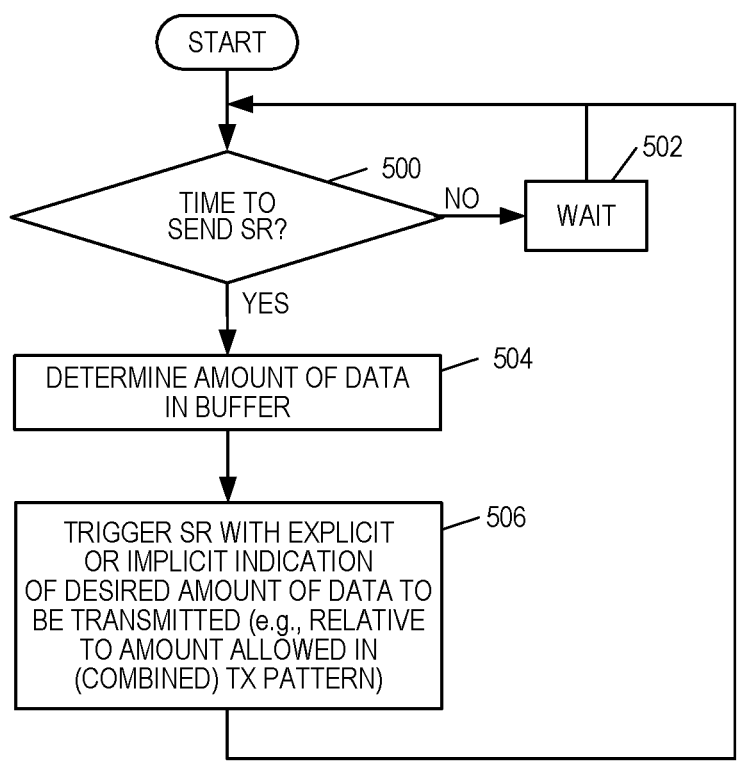

FIG. 7 illustrates an embodiment of the decision in step 108 of FIG. 2 according to some other embodiments of the present disclosure in which the SR includes an implicit or explicit indication of an amount of data/resources being requested. As illustrated, the wireless device 18 determines whether it is time to potentially transmit a SR (step 500). As noted above, in some embodiments, the process is performed based on a combined transmit pattern. In other embodiments, the process is performed based on an individual transmit pattern. The transmit pattern (either a combined transmit pattern or an individual transmit pattern) defines multiple transmit opportunities and the times at which these multiple transmit opportunities occur. In step 500, the wireless device 18 determines whether it is time to transmit a SR to request resources for a next, or upcoming, transmit opportunity in the transmit pattern, if so desired by the wireless device 18. If it is not time to transmit a SR for the next transmit opportunity, the wireless device 18 waits (step 502).

In this embodiment, the wireless device 18 also determines an amount of data in the buffer at the wireless device 18 waiting for transmission (step 504). The wireless device 18 then triggers a SR with an explicit or implicit indication of a desired amount of data to be transmitted (i.e., the amount of data in the buffer) (step 506). This indication may be an indication of the desired amount of data relative to the amount of data defined for the next transmit occurrence in the transmit pattern.

For example, in some embodiments, different types of SRs may be used to indicate different amounts of data. In one specific example, a first type of SR may be used to indicate that the full amount of data is waiting for transmission (i.e., the amount of data in the buffer is greater than or equal to or at least approximately or nearly equal to the amount of data defined for the transmit opportunity in the transmit pattern), a second type of SR may be used to indicate that less than the full amount (e.g., ½ the full amount) is waiting for transmission, etc. The different types of SRs may be distinguished by the resources (e.g., time resources—e.g., TTIs) used for transmission of the SRs. For example, for each transmit opportunity, there two (or more) SR opportunities (resources) allocated for the wireless device 18. The SR is transmitted on one of the SR opportunities to indicate a first amount (e.g., full amount) of data is waiting for transmission, and the SR is transmitted on another one of the SR opportunities to indicate a second amount (e.g., ½ amount) of data is waiting for transmission. Thus, in some embodiments, the types of SRs can be distinguished, for example, by allocating two SR opportunities for the wireless device 18 some milliseconds apart, one to mean sufficient data, the other to mean "some data available." The base station 14 will match the time at which the SR is received with the meaning/amount of data waiting for transmission. Note that more than two types of SRs can be defined in this way for more granularity of the buffer size with respect to the pre-allocated transmission size. For example, a third SR (at a different time slot) could mean the buffer is at least twice as large as the pre-allocated transmission bits.

As another example, the SR may include an explicit indication of the amount of data waiting for transmission at the wireless device 18. The SR may, for example, use a new format. As an example, in LTE, a new Physical Uplink Control Channel (PUCCH) format may be used to transmit the SR where the new PUCCH format defines, for example, the SR as a three bit long field (instead of a one bit long field as currently defined). A three bit long SR allows the wireless device 18 to indicate eight levels/amounts of data waiting in the buffer at the wireless device 18 for transmission with respect to the pre-signaled "grant size in bits," which is the amount of data defined for the transmit occurrence in the transmit pattern. For example, with this new PUCCH format, the wireless device 18 can signal the SR including the amount of data waiting in the buffer for transmission to the base station 14 as follows:

000: reserve
001: regular SR to indicate one times the grant size
010: ½ times the grant size
011: two times the grant size
100: Grant meant for LCG 0. The grant size is defined by the transmit pattern(s) of LCG 0 in this case.
101: Grant meant for LCG 1. The grant size is defined by the transmit pattern(s) of LCG 1 in this case.
110: Grant meant for LCG 2. The grant size is defined by the transmit pattern(s) of LCG 3 in this case.
111: Grant meant for LCG 3. The grant size is defined by the transmit pattern(s) of LCG 3 in this case.

The new PUCCH format may be PUCCH format 4 but where the number of bits for the SR is three bits for both Frequency Division Duplexing (FDD) and Time Division Duplexing (TDD).

Figure 8:
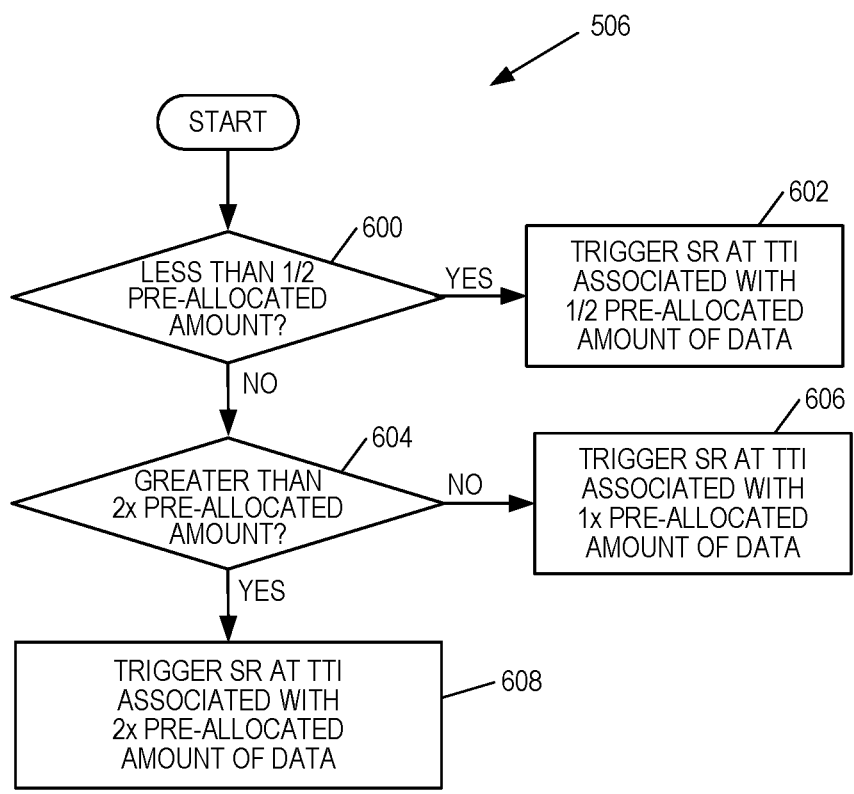

FIG. 8 is a flow chart that illustrates step 506 of FIG. 7 in more detail according to one example. As illustrated, once the wireless device 18 has decided to trigger the SR transmission, the wireless device 18 determines whether the amount of data in the buffer waiting for transmission is less than ½ of the pre-allocated amount of data (i.e., less than ½ of the amount of data defined for the transmit opportunity in the transmit pattern) (step 600). If so, the wireless device 18 triggers transmission of the SR at, or in, a TTI that is associated with ½ of the pre-allocated amount of data (step 602). If the amount of data in the buffer waiting for transmission is greater than ½ of the pre-allocated amount of data but less than two times the pre-allocated amount of data (step 604, NO), the wireless device 18 triggers transmission of the SR at, or in, a TTI that is associated with one times the pre-allocated amount of data (i.e., the full amount) (step 606). If the amount of data in the buffer waiting for transmission is greater than two times the pre-allocated amount of data, the wireless device 18 triggers transmission of the SR at, or in, a TTI that is associated with two times the pre-allocated amount of data (step 608).

Note that the threshold and the number of thresholds used in the example of FIG. 8 are only an example. The number of thresholds and the particular thresholds used may vary depending on the particular implementation. For example, a greater number of thresholds may be used when more granularity is desired for the indication of the amount of data waiting for transmission.

Figure 9A:
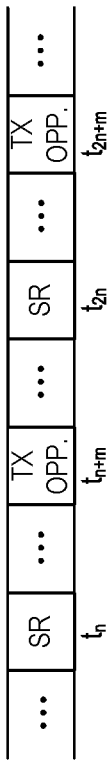
FIG. 9A illustrates one example of a transmit pattern and corresponding pre-scheduled times for transmitting SRs according to some embodiments of the present disclosure.

FIG. 9A illustrates one example of a transmit pattern and corresponding pre-scheduled times for transmitting SRs according to some embodiments of the present disclosure. Note that the pre-scheduled times for transmitting SRs are "pre-scheduled" in that resources for transmitting the SRs are reserved. The BSR resources are allocated only as a result of a SR. As illustrated, the transmit pattern includes transmit opportunities at times (e.g., TTIs or subframes) $t_{n+m}$, $t_{2n+m}$, $t_{3n+m}$, etc. In other words, the periodicity of the transmit pattern in this example is n. SRs are pre-scheduled at times $t_n$, $t_{2n}$, $t_{3n}$, etc. for the respective transmit opportunities at $t_{n+m}$, $t_{2n+m}$, $t_{3n+m}$, etc. Thus, if the wireless device 18 decides (e.g., according to any of the decision processes described herein) to transmit a SR for resources in the transmit opportunity at $t_{n+m}$, then the wireless device 18 transmits a SR at $t_n$. The value of m may be, e.g., predefined by standard. For example, the value of m may be 4 such that a SR is transmitted four TTIs, or subframes, before the respective transmit opportunity.

Figure 9B:
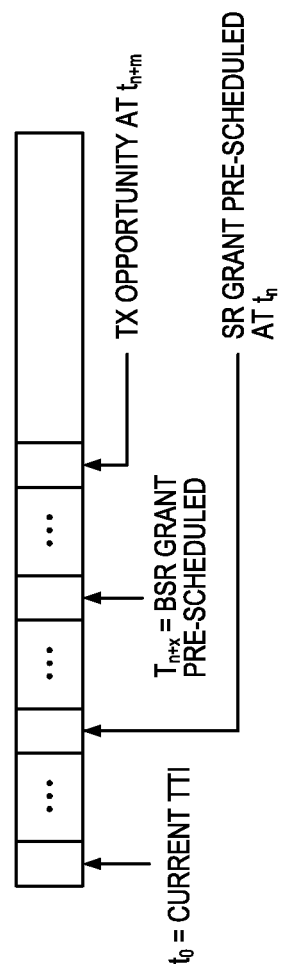
FIG. 9B illustrates timing of a SR with respect to a transmit opportunity in a transmit pattern in more detail according to one example embodiment.

FIG. 9B illustrates timing of a SR with respect to a transmit opportunity in a transmit pattern in more detail according to one example embodiment. As illustrated, in this particular example, in relation to a transmit opportunity at $t_{n+m}$, a SR is pre-scheduled at $t_n$, where m is, e.g., predefined. Optionally, in embodiments where the BSR procedure is performed, a BSR grant is pre-scheduled at $t_{n+x}$, where x<m. Thus, in operation, the wireless device 18 decides, e.g., at the current TTI $t_0$, whether to transmit a SR to request resources in the transmit opportunity at $t_{n+m}$. If the wireless device 18 decides to transmit a SR, the wireless device 18 transmits the SR at $t_n$. Optionally (i.e., in some embodiments), the wireless device 18 receives a BSR grant and, in response, transmits a BSR at $t_{n+x}$. The wireless device 18 then receives a data grant and, in response, transmits uplink data at $t_{n+m}$.

In step 100 of FIG. 2, an indication of the one or more transmit patterns for the wireless device 18 is signaled from the base station 14 to the wireless device 18. One example implementation of this signaling will now be described. In particular, this example implementation extends the RRC-ConnectionReconfiguration message described in 3GPP Technical Specification (TS) 36.331 (V13.0.0) to include transmit pattern information. This message already carries information for bearer creation and modification, Discontinuous Reception (DRX) configuration and reconfiguration, etc. As illustrated in FIGS. 10A to 10E, the LogicalChannelConfig Information Element of the RRCConnectionReconfiguration message can be extended to include a number of transmit pattern IDs (transmissionPatternIds). A transmit pattern ID is an identifier of a transmit pattern used by the logical channel. Each transmit pattern is defined by a number of parameters (e.g., patternType, patternTrigger, minInterTxDelay, etc.).

The transmit patterns have several applications. Much of the discussion herein focuses on the use of transmit patterns for SRs for the uplink. However, the transmit patterns may have other applications. For example, for downlink, the scheduler can follow the transmit pattern and whenever the system is not congested can allow up to the maximum payloads. Whenever the system is loaded the scheduler may reduce the transmissions to minimum payloads.

Some other parameters, such as the pattern type, indicate how the switching between two patterns is triggered when there are multiple patterns. For example, VoLTE traffic has periods of data packets and periods of silence packets. Each period is represented by at least one pattern. The switching is triggered by things like packet size and inter-packet delays.

FIGS. 10F and 10G illustrate one example of how 3GPP TS 36.321 (V13.0.0) can be modified to incorporate one embodiment of the present disclosure. In this example, the wireless device 18 waits for two conditions to occur before sending a SR for a respective transmit opportunity in a transmit pattern. These two conditions are: (1) the amount of data in the buffer, or queue, waiting for transmission is greater than or equal to minPayloads (i.e., the amount of data pre-allocated or pre-scheduled for the transmit occasion) and (2) it is time to send a SR for the transmit occasion, which in this example is determined by the expiry of a minInterTxDelay period/timer. When the base station 14 receives the SR, the base station 14 sends a data grant for an amount of resources that is sufficient for the wireless device 18 to transmit data of size minPayloads without performing the BSR procedure. When the wireless device 18 receives the grant, the wireless device 18 uses the individual transmit patterns for the LCGs to allocate the granted resources to the LCGs. The allocation, or transmission priority, is decided as illustrated in FIGS. 10F and 10G.

Aligning SR Transmit Opportunities to Transmit Patterns

The resources allocated for SRs are periodic resources allocated to the wireless device 18 by the base station 14. When the base station 14 generates the transmit patterns for the wireless device 18, the SR resources can be modified to (better) align with the transmit patterns of the wireless device 18. Thus, in the processes described herein, the base station 14 may further operate to configure or otherwise modify the SR resources (i.e., the SR transmit opportunities) for the wireless device 18 based on the transmit pattern(s) for the wireless device 18.

Example 1

The combined transmit pattern for the wireless device 18 specifies transmit opportunities with a minimum waiting period of 40 ms between transmit opportunities. In this case, the SR resources can be also allocated with a 40 ms periodicity.

Example 2

The combined transmit pattern of the wireless device 18 specifies a minimum wait of 50 ms between transmit opportunities. The SR resource is set to a periodicity of 10 ms with the following meaning attached to each SR transmitted within a 50 ms window:
- One SR received by the base station 14 from the wireless device 18 within the 50 ms window since the last grant was allocated indicates "n" number of bits waiting for transmission.
- Two SRs received by the base station 14 within the 50 ms window since the last grant was allocated indicates "2n" number of bits waiting for transmission.
- Three SRs received by the base station 14 within the 50 ms window since the last grant was allocated indicates "3n" number of bits waiting for transmission.

QoS Patterns

As discussed above, in some embodiments, transmit patterns are generated based on QoS patterns for the respective radio bearers/logical channels. Importantly, a QoS pattern is generic information that repeats in time but without mapping to resources, subframe offsets, etc. For instance, a QoS pattern is indicative of QoS requirements. For example, if the QoS requirements include a bit rate of 12.2 kbps and maximum latency of 20 ms, then the QoS pattern may be 12.2*20=244 bits every 20 ms. However, this QoS pattern is not mapped to resources. In contrast, a transmit pattern includes a pattern of transmit opportunities that are mapped to specific resources. For example, for a QoS pattern of 244 bits every 20 ms, a respective transmit pattern may include a transmit opportunity for 244 bits every 20 ms, where each transmit opportunity is mapped to respective resources (e.g., respective TTIs or subframes). In some embodiments, a transmit pattern is mapped to resources by specifying a starting time for a first transmit opportunity in the transmit pattern.

QoS patterns can be signaled between nodes. For example, the wireless device 18 may determine QoS patterns for its logical channels/radio bearers and signal those QoS patterns to the base station 14, which may then use the QoS patterns to determine transmit patterns for the wireless device 18 and signal those transmit patterns to the wireless device 18, as described above.

In some embodiments, a QoS pattern may include one or more sub-patterns. Where there is more than one sub-pattern, a trigger may be specified to determine when to switch between the different sub-patterns. In some embodiments, dynamic switching between the different sub-patterns of a QoS pattern is provided. For example, the network (e.g., the base station 14) may use a QoS pattern that includes multiple sub-patterns to dynamically generate a transmit pattern for a corresponding LCG. The base station 14 would then signal the indication of the dynamically generated transmit pattern to the wireless device 18.

Figure 11:
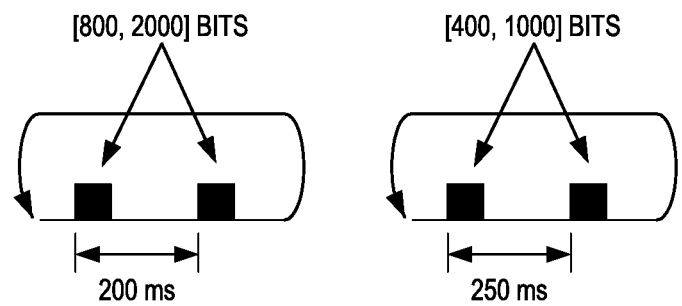
FIG. 11 illustrates an example of a Quality of Service (QoS) pattern for best effort traffic in which the QoS pattern includes two sub-patterns.

FIG. 11 illustrates an example of a QoS pattern for best effort traffic in which the QoS pattern includes two sub-patterns. The first sub-pattern is illustrated on the left-hand side of FIG. 11 and is as follows:

```
patternId = 1
// Best effort with congestion below 50%
sub-patternType = MAIN_ALT; // alternate based on trigger
sub-patternTrigger = THRESHOLD;
threshold = 50; // less than 50% congestion
txTimes = 200; // 200 ms between transmissions
minPayload = 800; // best effort, don't need to send much if
congested cells
maxPayload = 2000; // in bits
```

The second sub-pattern is illustrated on the right-hand side of FIG. 11 and is as follows:

```
patternId = 1
// Best effort with congestion between 50% and 70%
sub-patternType = SEC_ALT; // alternate based on the trigger
sub-patternTrigger = THRESHOLD;
threshold = 70; // less than 70% congestion
txTimes = 250; // 20 ms between transmissions
minPayload = 400; // best effort, don't need to send much if
congested cells
maxPayload = 1000; // in bits
```

Figure 12:
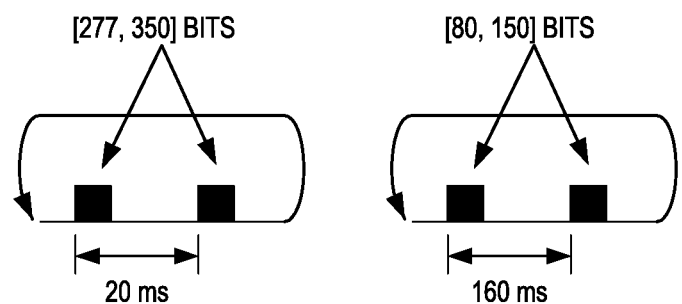
FIG. 12 illustrates an example of a QoS pattern for Voice over Long Term Evolution (LTE) (VoLTE) traffic in which the example QoS patterns include two sub-patterns.

FIG. 12 illustrates an example of a QoS pattern for VoLTE traffic in which the example QoS patterns include two sub-patterns. The first sub-pattern is illustrated on the left-hand side of FIG. 12 and is as follows:

```
patternId = 2
// VoLTE data pattern
sub-patternType = MAIN_ALT; // alternate based on trigger
sub-patternTrigger = DELAY_AND_SIZE;
threshold = 10; // range [–10%, 10%] of packet arrival triggers this
sub-pattern
// and packet size within range
txTimes = 20; // 200 ms between transmissions
minPayload = 277; // in bits.
maxPayload = 350; // in bits
```

The second sub-pattern is illustrated on the right-hand side of FIG. 12 and is as follows:

```
patternId = 2
// VoLTE SID pattern
sub-patternType = SEC_ALT; // alternate based on the trigger
sub-patternTrigger = DELAY_AND_SIZE;
threshold = 20; // range [–20%, 20%] of packet arrival triggers this
sub-pattern
// and packet size within range
txTimes = 160; // 160 ms between transmissions
minPayload = 80; // in bits
maxPayload = 150; // in bits
```

Note that QoS patterns may have additional or alternative uses to those disclosed herein with respect to transmit patterns. Some examples are:

1. Defining agreements of what is to be transmitted and received between two or more entities or nodes.
2. Defining the agreements of any type of resource utilization (not just transmission resources) between two or more entities or nodes.
3. Making use of patterns to decide if new bearers or services can be admitted based on the characteristics specified in the QoS patterns, and based off the already admitted bearers or services and their combined pattern effect on the resources in the current and future transmission slots.
4. Making use of patterns to assist the scheduler by providing the times to transmit, the bits to transmit, times of the day to use different patterns, days of year to use different patterns, etc., for a bearer, service, UE, etc.
5. Making use of patterns to define the agreements for specific links in lease lines in a network. One or more patterns can be used to implement the Service Level Agreement (SLA) between vendors for a portion of the network resources.
6. Making use of patterns to limit the amount of traffic transmitted, received, discarded, or processed between entities or nodes (i.e., traffic shaping and traffic policing).
7. Traffic splitting between two or more possible paths by splitting a QoS pattern into two or more sub-patterns. Such sub-patterns are distributed to the different links, connections, or bearers handling the partial requirements.
8. Traffic combination. Being able to specify how to recombine traffic by recombining a set of QoS patterns by a receiving entity or node.
9. Being able to communicate QoS characteristics between network nodes or between entities for specific resources. Such resources can be bandwidth, memory, control plane resources (i.e., LTE Control Channel Elements (CCEs)), data plane resources (i.e., LTE resource blocks), etc. For example, an LTE eNB can send instructions to a UE on the pattern that grants will follow for a specific bearer/Logical channel group, this way the UE doesn't waste resources sending SRs whenever there is data in a queue. Instead the UE "knows" based on the QoS pattern when the eNB will send the grant without the need to request it.

The pattern can be as simple as the description of how often packets are sent and their expected size range, or the pattern can be more complex and defined the other characteristics such as priorities at different times, allowed node delays, different packet size range at different transmission times (e.g., some video codecs have full resolution frames and partial resolution frames), time of day to apply it (there can be multiple patterns for different times), etc.

Traffic Splitting Using QoS Patterns and Sub-Patterns

A traffic flow (i.e., a connection, bearer, service, etc.) can be split into sub-flows for the purpose of transmitting portions of it via different links or paths by creating sub-patterns for each sub-flow. The sub-patterns are then signaled to the receiving entities.

Sub-patterns can be applied to case such as carrier aggregation where multiple cells are used to transmit traffic for a bearer.

Examples on how to create sub-patterns:
Sub-patterns can be created time-wise by alternating the transmission among the transmission links.
Sub-patterns can be created bandwidth-wise by leaving the times to transmit unchanged but assigning portions of the bits to transmit to different patterns.
Leave the original pattern unchanged but activate the pattern of a different link or path based on the day and time or based on which path has more resources available.

Traffic Combination Using QoS Patterns and Sub-Patterns

When a traffic flow (i.e., a connection, bearer, service, etc.) is split by the sender, the sub-flows need to be combined at the receiver. Sub-patterns signaled by the sender ahead of time can be used to recombine the sub-flows into flows.

Sub-patterns tell the receiver which paths (i.e., links, connection, bearers, or cells) are sending what and at what time.

Sub-pattern combination can be used by UE (or base station) in cases such as carrier aggregation where multiple cells are used to transmit traffic for a bearer.

Traffic Shaping and Policing Using QoS Patterns

Traffic shaping and policing is achieved using QoS patterns by having a transmitting entity follow the requirements and constraints specified in one or more patterns for a specific link, interface, bearer, etc.

Example Advantages

Embodiments of the present disclosure increase the capacity of the cell 16 and the capacity of the base station 14 as a whole for one or more of following reasons:
The wireless device 18 (e.g., UE) sends an SR only after a minimum period since the last time the wireless device 18 transmitted for that LCG. The greatest benefit here is that the wireless device 18 does not send SRs as soon as there is data to send for a LCG, but rather when the QoS patterns for the LCG indicates it is time. This condition allows the wireless device 18 to meet the QoS requirements in terms of maximum allowed inter-transmission delay. Also the base station 14 (e.g., eNB) SR resources are freed up for other uses since the base station 14 handles fewer SRs.
The wireless device 18 sends an SR only after a minimum amount of data is accumulated in the queue of a LCG, as indicated by the transmit pattern signal from the base station 14 to the wireless device 18. This condition allows the wireless device 18 to meet the QoS requirements in term of bit rates and at the same time avoid unnecessary SR transmissions.
The BSRs are eliminated for the LCGs with the use of transmit patterns at the wireless device 18 when the wireless device 18 uses the transmit pattern to learn the grant sizes. The base station 14 encodes the transmit patterns in the grant sizes in bits that the base station 14 is willing to send to a wireless device 18 for a specific LCG. The base station 14 calculates the grant sizes based on the QoS patterns associated with the services to use the LCG and based on other conditions such as availability of resources, wireless device 18 and LCG priorities, etc.
The transmit patterns can be used to specify "combine" grants. A single grant from the base station 14 can be used for multiple LCGs in a wireless device 18 by applying the transmit patterns once a grant is received by the wireless device 18.
For downlink traffic, the base station 14 benefits from the use of transmit patterns too. The scheduler for a cell 16 does not schedule a bearer until the minimum delay since the last transmission is met, and until a minimum number of bits are available for transmission. Bearers and LCGs can be assigned tentative transmission sub-frame offsets in a way to maximize resource utilization by spreading the load across time. For example, video calls can be spread across multiple transmission slots (TTIs) by considering existing calls when building a new transmit pattern for a new call.
When the transmit patterns are followed fully for an uplink LCG and/or a downlink bearer, automatic traffic shaping and full service QoS requirements and constraints compliancy are achieved.

Network Node and Wireless Device Block Diagrams

Figure 13:
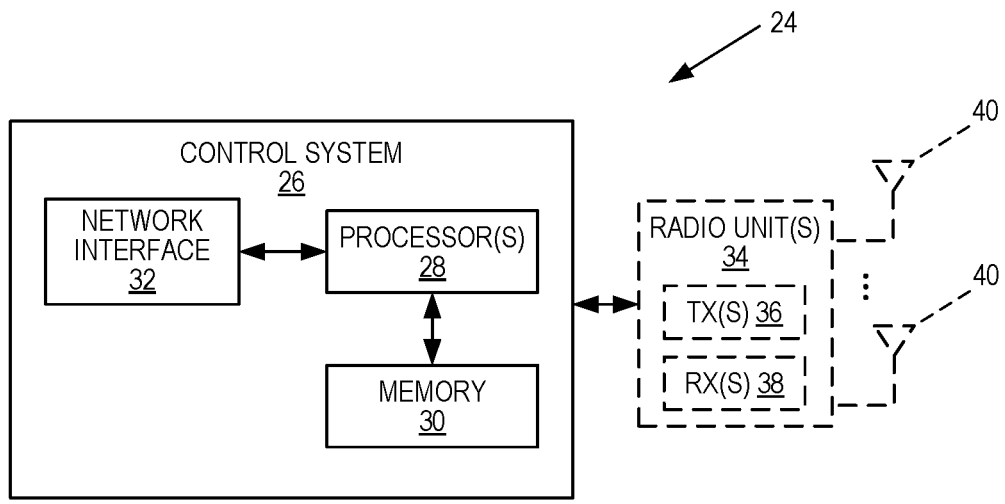
FIGS. 13 to 15 illustrate example embodiments of a network node.

FIG. 13 is a schematic block diagram of a network node 24 according to some embodiments of the present disclosure. The network node 24 may be, for example, a radio access node such as, for example, a base station 14 or a core network 22. As illustrated, the network node 24 includes a control system 26 that includes one or more processors 28 (e.g., Central Processing Units (CPUs), Application Specific Integrated Circuits (ASICs), Field Programmable Gate Arrays (FPGAs), and/or the like), memory 30, and a network interface 32. In addition, if the network node 24 is a radio access node, then the network node 24 also includes one or more radio units 34 that each includes one or more transmitters 36 and one or more receivers 38 coupled to one or more antennas 40. In some embodiments, the radio unit(s) 34 is external to the control system 26 and connected to the control system 26 via, e.g., a wired connection (e.g., an optical cable). However, in some other embodiments, the radio unit(s) 34 and potentially the antenna(s) 40 are integrated together with the control system 26. The one or more processors 28 operate to provide one or more functions of a network node as described herein. In some embodiments, the function(s) are implemented in software that is stored, e.g., in the memory 30 and executed by the one or more processors 28.

Figure 14:
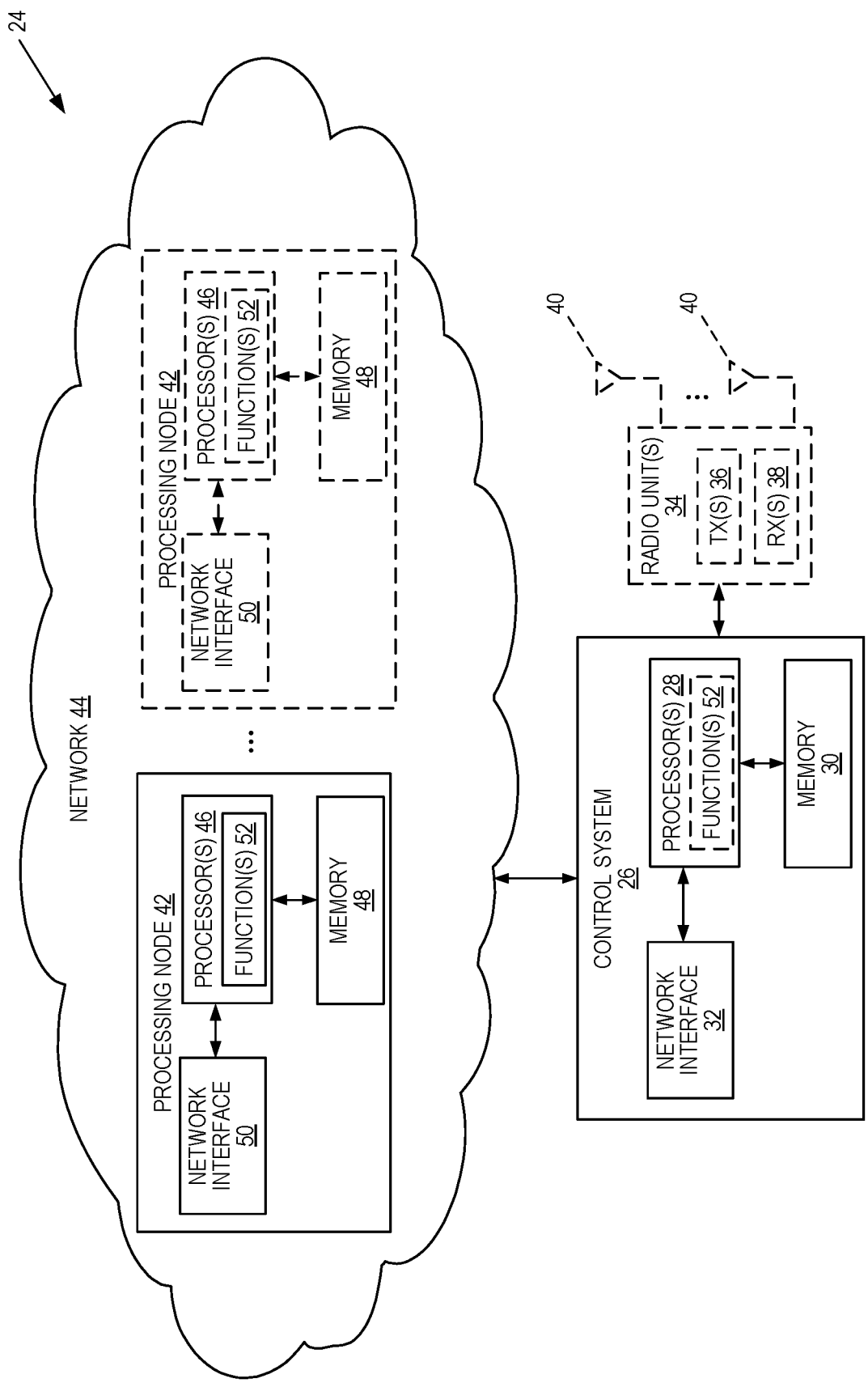

FIG. 14 is a schematic block diagram that illustrates a virtualized embodiment of the network node 24 according to some embodiments of the present disclosure. As used herein, a "virtualized" network node (e.g., a virtualized base station or a virtualized radio access node) is an implementation of the network node 24 in which at least a portion of the functionality of the network is implemented as a virtual component (e.g., via a virtual machine(s) executing on a physical processing node(s) in a network(s)). As illustrated, in this example, the network node 24 includes the control system 26 that includes the one or more processors 28 (e.g., CPUs, ASICs, FPGAs, and/or the like), the memory 30, and the network interface 32 and, depending on the type of network node, the one or more radio units 34 that each includes the one or more transmitters 36 and the one or more receivers 38 coupled to the one or more antennas 40, as described above. The control system 26 is connected to the radio unit(s) 34 via, for example, an optical cable or the like. The control system 26 is connected to one or more processing nodes 42 coupled to or included as part of a network(s) 44 via the network interface 32. Each processing node 42 includes one or more processors 46 (e.g., CPUs, ASICs, FPGAs, and/or the like), memory 48, and a network interface 50.

In this example, functions 52 of the network node 24 (e.g., functions of the base station 14 described above) described herein are implemented at the one or more processing nodes 42 or distributed across the control system 26 and the one or more processing nodes 42 in any desired manner. In some particular embodiments, some or all of the functions 52 of the network node 24 described herein are implemented as virtual components executed by one or more virtual machines implemented in a virtual environment(s) hosted by the processing node(s) 42. As will be appreciated by one of ordinary skill in the art, additional signaling or communication between the processing node(s) 42 and the control system 26 is used in order to carry out at least some of the desired functions 52. Notably, in some embodiments, the control system 26 may not be included, in which case the radio unit(s) 34, if present, communicate directly with the processing node(s) 42 via an appropriate network interface(s). Further, in embodiments in which the network node 24 is not a radio access node (e.g., a core network node 22), then the network node 24 may be entirely virtualized (i.e., there may be no control system 26 or radio unit(s) 34.

In some embodiments, a computer program including instructions which, when executed by at least one processor, causes the at least one processor to carry out the functionality of a network node or a node (e.g., a processing node 42) implementing one or more of the functions 52 of the network node in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
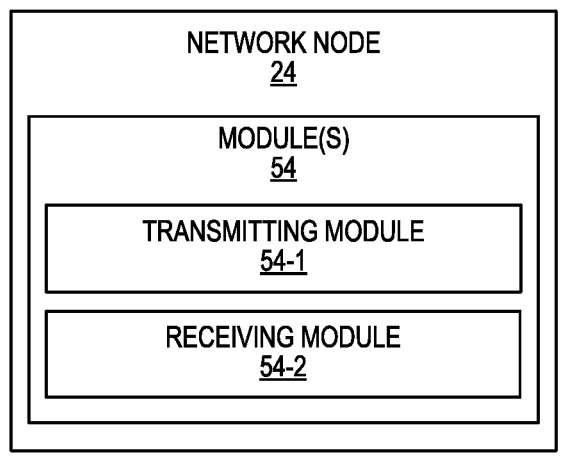

FIG. 15 is a schematic block diagram of the network node 24 according to some other embodiments of the present disclosure. The network node 24 includes one or more modules 54, each of which is implemented in software. The module(s) 54 provide the functionality of the network node 24 described herein. For example, the module(s) 54 may include one or modules that perform the operations of the network node 24 described with respect to FIG. 2 above. For example, the module(s) 54 may include a transmitting module 54-1 operable to transmit, to the wireless device 18, an indication of one or more transmit patterns for one or more logical channel groups, wherein each transmit pattern of the one or more transmit patterns defines a plurality of transmit opportunities, as described above. The module(s) 54 may also include a receiving module 54-2 operable to receive a SR from the wireless device 18 that requests resources for a transmission of uplink data from the wireless device 18 in accordance with the one or more transmit patterns, as described above. The module(s) 54 may include additional modules that are operable to perform the other functions of the network node 24 described herein.

Figure 16:
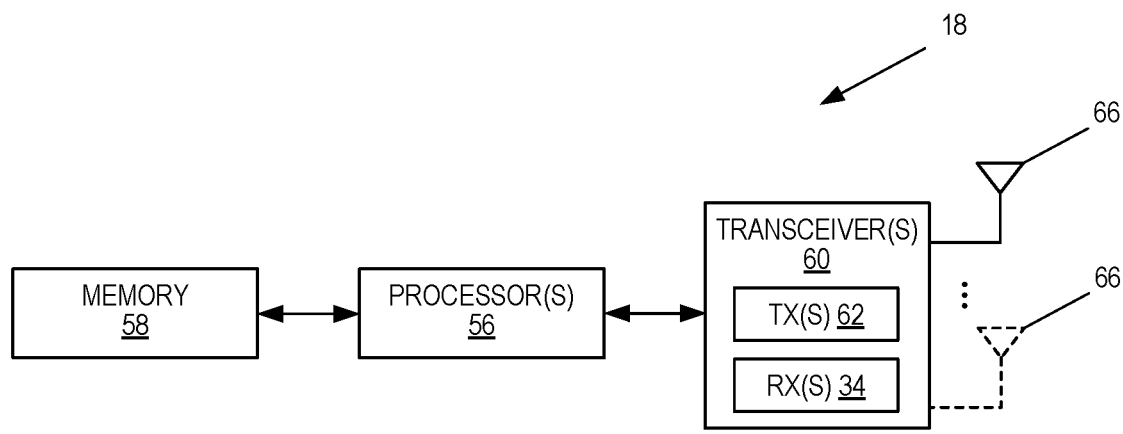
FIGS. 16 and 17 illustrate example embodiments of a wireless device.

FIG. 16 is a schematic block diagram of the wireless device 18 according to some embodiments of the present disclosure. As illustrated, the wireless device 18 includes one or more processors 56 (e.g., CPUs, ASICs, FPGAs, and/or the like), memory 58, and one or more transceivers 60 each including one or more transmitters 62 and one or more receivers 64 coupled to one or more antennas 66. In some embodiments, the functionality of the wireless device 18 described above (e.g., with respect to FIGS. 2 and 4-8) may be fully or partially implemented in software that is, e.g., stored in the memory 58 and executed by the processor(s) 56.

In some embodiments, a computer program including instructions which, when executed by at least one processor, causes the at least one processor to carry out the functionality of the wireless device 18 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
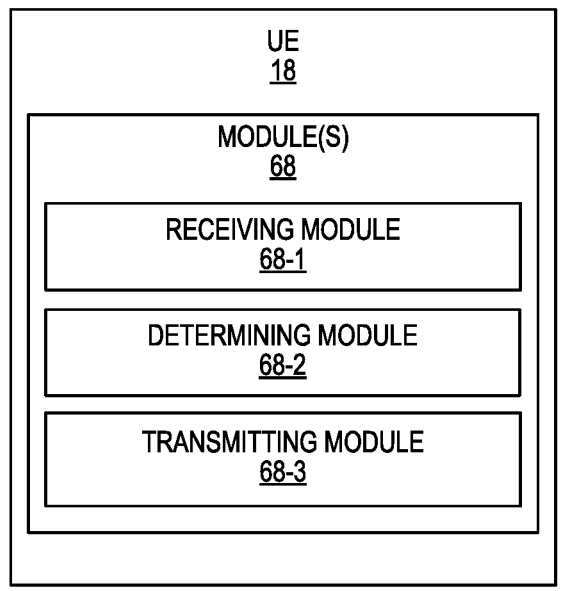

FIG. 17 is a schematic block diagram of the wireless device 18 according to some other embodiments of the present disclosure. The wireless device 18 includes one or more modules 68, each of which is implemented in software. As an example, in some embodiments, the one or more modules 68 include one or more modules that operate to perform the process described above with respect to FIG. 2. For example, the module(s) 68 may include a receiving module 68-1 operable to receive an indication of one or more transmit patterns for one or more logical channel groups, wherein each transmit pattern of the one or more transmit patterns defines a plurality of transmit opportunities, as described above. The module(s) 68 may also include a determining module 68-2 operable to, based on the one or more transmit patterns, determine when to transmit a SR for transmission of data in accordance with the one or more transmit patterns. The module(s) 68 may also include a transmitting module 68-3 operable to, upon determining that it is time to transmit a SR, transmit a SR to a radio access node to thereby request resources for transmission of uplink data in accordance with the one or more transmit patterns. The module(s) 68 may include additional modules that are operable to perform the other functions of the wireless device 18 described herein.

The following acronyms are used throughout this disclosure.

3GPP Third Generation Partnership Project
5G Fifth Generation
ASIC Application Specific Integrated Circuit
BSR Buffer Status Report
CCE Control Channel Element
CPU Central Processing Unit
DRX Discontinuous Reception
eNB Enhanced or Evolved Node B
FPGA Field Programmable Gate Array
ID Identifier
kpbs Kilobits per Second
LCG Logical Channel Group LTE Long Term Evolution
MAC Medium Access Control
MME Mobility Management Entity
ms Millisecond
MTC Machine Type Communication
PBR Prioritized Bit Rate
PDN Packet Data Network
P-GW Packet Data Network Gateway
PUCCH Physical Uplink Control Channel
QoS Quality of Service
RACH Random Access Channel
RAN Radio Access Network
RRC Radio Resource Control
SCEF Service Capability Exposure Function
S-GW Serving Gateway
SLA Service Level Agreement
SR Scheduling Request
TS Technical Specification
TTI Transmit Time Interval
UE User Equipment
VoLTE Voice over Long Term Evolution Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network, comprising:
    receiving an indication of one or more transmit patterns for one or more logical channel groups, wherein each transmit pattern of the one or more transmit patterns defines a plurality of transmit opportunities, and
        wherein the one or more transmit patterns comprise a plurality of transmit patterns;
    generating a combined transmit pattern for the wireless device based on the one or more transmit patterns;
    based on the one or more transmit patterns, determining when to transmit a scheduling request for transmission of data in accordance with the one or more transmit patterns,
        wherein determining when to transmit a scheduling request comprises determining when to transmit the scheduling request based on the combined transmit pattern; and
    upon determining that it is time to transmit a scheduling request, transmitting a scheduling request to a radio access node to thereby request resources for transmission of uplink data in accordance with the one or more transmit patterns.

2. The method of claim 1 wherein:
    the one or more transmit patterns comprise a plurality of transmit patterns;
    each transmit pattern of the plurality of transmit patterns comprise a delay constraint that defines an amount of time between adjacent transmit opportunities in the plurality of transmit opportunities defined by the transmit pattern; and
    determining when to transmit a scheduling request comprises determining when to transmit a scheduling request based on a minimum delay constraint among the plurality of transmit patterns.

3. The method of claim 1 wherein determining when to transmit a scheduling request comprises:
    determining whether it is time to transmit a scheduling request for a next transmit opportunity of the transmit opportunities defined by the one or more transmit patterns; and
    upon determining that it is time to transmit a scheduling request, initiating the transmitting of the scheduling request regardless of an amount of data that is waiting for uplink transmission.

4. The method of claim 3 further comprising:
    in response to transmitting the scheduling request, receiving a grant for transmission of a buffer status report;
    transmitting a buffer status report in accordance with the grant for transmission of the buffer status report, the buffer status report comprising an indication of the amount of data that is waiting for uplink transmission;
    in response to transmitting the buffer status report, receiving a grant for uplink transmission of data; and
    transmitting data in accordance with the grant for uplink transmission of data.

5. The method of claim 1 wherein determining when to transmit a scheduling request comprises:
    determining whether it is time to transmit a scheduling request for a next transmit opportunity of the one or more transmit patterns;
    determining whether an amount of data waiting for uplink transmission is greater than or equal to a predefined amount of data; and
    upon determining that it is time to transmit a scheduling request and that the amount of data waiting for uplink transmission is greater than or equal to the predefined amount of data, initiating the transmitting of the scheduling request.

6. The method of claim 5 further comprising:
    in response to transmitting the scheduling request, receiving a grant of an amount of resources for uplink transmission of the predefined amount of data without first transmitting a buffer status report to the radio access node; and
    transmitting the predefined amount of data in accordance with the grant.

7. The method of claim 5 wherein the next transmit opportunity is a next transmit opportunity defined by one of the one or more transmit patterns, and the predefined amount of data is an amount of data defined for the next transmit opportunity.

8. The method of claim 5 wherein the one or more transmit patterns is a plurality of transmit patterns, the next transmit opportunity is a next transmit opportunity defined by a combined transmit pattern generated based on the plurality of transmit patterns, and the predefined amount of data is an amount of data defined for the next transmit opportunity in the combined transmit pattern.

9. The method of claim 1 wherein determining when to transmit a scheduling request comprises:
    determining whether an amount of data waiting for uplink transmission is greater than or equal to a predefined amount of data;
    determining whether it is time to transmit a scheduling request using a predefined algorithm; and
    upon determining that the amount of data waiting for uplink transmission is greater than or equal to the predefined amount of data and that it is time to transmit a scheduling request, initiating the transmitting of the scheduling request.

10. The method of claim 1 wherein determining when to transmit a scheduling request comprises:
   determining whether it is time to transmit a scheduling request for a next transmit opportunity of the one or more transmit patterns;
   determining an amount of data waiting for uplink transmission; and
   upon determining that it is time to transmit a scheduling request, initiating the transmitting of the scheduling request, the scheduling request providing an indication of the amount of data waiting for uplink transmission.

11. The method of claim 10 wherein the indication of the amount of data waiting for uplink transmission is an implicit indication.

12. The method of claim 11 wherein the implicit indication is a transmit time interval in which the scheduling request is transmitted, wherein the transmit time interval has a predefined association with a predefined amount of data.

13. The method of claim 10 wherein the indication of the amount of data waiting for uplink transmission is an explicit indication.

14. The method of claim 1 wherein each transmit opportunity of the plurality of transmit opportunities is an opportunity for uplink transmission of a defined amount of data from the wireless device at a defined time.

15. The method of claim 14 wherein, for each transmit pattern of the one or more transmit patterns, the defined amount of data is the same for each of the plurality of transmit opportunities defined for the transmit pattern.

16. A wireless device for operation in a cellular communications network, comprising:
   circuitry containing instructions which, when executed, cause the wireless device to:
      receive an indication of one or more transmit patterns for one or more logical channel groups, wherein each transmit pattern of the one or more transmit patterns defines a plurality of transmit opportunities, and wherein the one or more transmit patterns comprise a plurality of transmit patterns;
      generating a combined transmit pattern for the wireless device based on the one or more transmit patterns;
      based on the one or more transmit patterns, determine when to transmit a scheduling request for transmission of data in accordance with the one or more transmit patterns,
         wherein determining when to transmit a scheduling request comprises determining when to transmit the scheduling request based on the combined transmit pattern; and
      upon determining that it is time to transmit a scheduling request, transmit a scheduling request to a radio access node to thereby request resources for transmission of uplink data in accordance with the one or more transmit patterns.

17. A method of operation of a base station in a cellular communications network, comprising:
   transmitting, to a wireless device, an indication of one or more transmit patterns for one or more logical channel groups, wherein each transmit pattern of the one or more transmit patterns defines a plurality of transmit opportunities;
   receiving a scheduling request from the wireless device that requests resources for a transmission of uplink data from the wireless device in accordance with the one or more transmit patterns, and
   in response to receiving the scheduling request, transmitting, to the wireless device, a grant of an amount of resources for uplink transmission of a predefined amount of data without first obtaining a buffer status report from the wireless device,
      wherein the predefined amount of data is an amount of data defined for a next transmit opportunity of the plurality of transmit opportunities defined by one of the one or more transmit patterns.

18. The method of claim 17 further comprising:
   in response to receiving the scheduling request, transmitting, to the wireless device, a grant for transmission of a buffer status report;
   receiving a buffer status report from the wireless device in accordance with the grant for transmission of the buffer status report, the buffer status report comprising an indication of an amount of data that is waiting for uplink transmission;
   in response to receiving the buffer status report, transmitting a grant for uplink transmission of data; and
   receiving data from the wireless device in accordance with the grant for uplink transmission of data.

19. The method of claim 17, wherein the one or more transmit patterns is a plurality of transmit patterns, and the predefined amount of data is an amount of data defined for a next transmit opportunity in a combined transmit pattern, the combined transmit pattern being a combination of the plurality of transmit patterns.

20. The method of claim 17 wherein the scheduling request comprises an indication of an amount of data waiting at the wireless device to be transmitted, and the method further comprises transmitting, to the wireless device, a grant for an amount of resources that is sufficient for uplink transmission of the amount of data indicated by the scheduling request.

21. The method of claim 20 wherein the indication of the amount of data waiting for uplink transmission is an implicit indication.

22. The method of claim 21 wherein the implicit indication is a transmit time interval in which the scheduling request is transmitted, wherein the transmit time interval has a predefined association with a predefined amount of data.

23. The method of claim 20 wherein the indication of the amount of data waiting for uplink transmission is an explicit indication.

24. The method of claim 17 wherein each transmit opportunity of the plurality of transmit opportunities is an opportunity for uplink transmission of a defined amount of data from the wireless device at a defined time.

25. The method of claim 24 wherein, for each transmit pattern of the one or more transmit patterns, the defined amount of data is the same for each of the plurality of transmit opportunities defined for the transmit pattern.

26. A base station for operation in a cellular communications network, comprising:
   circuitry containing instructions which, when executed, cause the base station to:
      transmit, to a wireless device, an indication of one or more transmit patterns for one or more logical channel groups, wherein each transmit pattern of the one or more transmit patterns defines a plurality of transmit opportunities;
      receive a scheduling request from the wireless device that requests resources for a transmission of uplink data from the wireless device in accordance with the one or more transmit patterns,
      in response to receiving the scheduling request, transmitting, to the wireless device, a grant of an amount of resources for uplink transmission of a predefined amount of data without first obtaining a buffer status report from the wireless device, wherein the predefined amount of data is an amount of data defined for a next transmit opportunity of the plurality of transmit opportunities defined by one of the one or more transmit patterns.

\* \* \* \* \*